(12) United States Patent
Senkal et al.

(10) Patent No.: US 11,841,228 B2
(45) Date of Patent: Dec. 12, 2023

(54) DRIVE AND SENSE BALANCED, FULLY-COUPLED 3-AXIS GYROSCOPE

(71) Applicant: INVENSENSE, INC., San Jose, CA (US)

(72) Inventors: Doruk Senkal, San Jose, CA (US); Robert Hennessy, San Jose, CA (US); Houri Johari-Galle, San Jose, CA (US); Joe Seeger, Menlo Park, CA (US)

(73) Assignee: INVENSENSE, INC., San Jose, CA (US)

( * ) Notice: Subject to any disclaimer, the term of this patent is extended or adjusted under 35 U.S.C. 154(b) by 131 days.

(21) Appl. No.: 17/467,145

(22) Filed: Sep. 3, 2021

(65) Prior Publication Data

US 2021/0396519 A1    Dec. 23, 2021

Related U.S. Application Data

(63) Continuation of application No. 16/138,637, filed on Sep. 21, 2018, now Pat. No. 11,118,907.

(51) Int. Cl.
*G01C 19/5712* (2012.01)
*G01C 19/5783* (2012.01)

(52) U.S. Cl.
CPC ..... *G01C 19/5712* (2013.01); *G01C 19/5783* (2013.01)

(58) Field of Classification Search
None
See application file for complete search history.

(56) References Cited

U.S. PATENT DOCUMENTS 8,549,915 B2    10/2013  Schofield et al.
8,616,057 B1 *  12/2013  Mao ..................... G01C 19/574
                                            73/504.12

FOREIGN PATENT DOCUMENTS

EP    2339293    6/2011
EP    2884229    6/2015

OTHER PUBLICATIONS

International Search Report dated Dec. 19, 2019 for PCT Application No. PCT/US2019/052243, 19 pages.
(Continued)

*Primary Examiner* — Paul M. West
*Assistant Examiner* — Mark A Shabman
(74) *Attorney, Agent, or Firm* — Amin, Turocy & Watson, LLP

(57) ABSTRACT

The subject disclosure provides exemplary 3-axis (e.g., GX, GY, and GZ) linear and angular momentum balanced vibratory rate gyroscope architectures with fully-coupled sense modes. Embodiments can employ balanced drive and/or balanced sense components to reduce induced vibrations and/or part to part coupling. Embodiments can comprise two inner frame gyroscopes for GY sense mode and an outer frame or saddle gyroscope for GX sense mode and drive system coupling, drive shuttles coupled to the two inner frame gyroscopes or outer frame gyroscope, and four GZ proof masses coupled to the inner frame gyroscopes for GZ sense mode. Components can be removed from an exemplary overall architecture to fabricate a single axis or two axis gyroscope and/or can be configured such that a number of proof-masses can be reduced in half from an exemplary overall architecture to fabricate a half-gyroscope. Other embodiments can employ a stress isolation frame to reduce package induced stress.

20 Claims, 14 Drawing Sheets

(56) References Cited

OTHER PUBLICATIONS

Non Final Office Action for U.S. Appl. No. 16/138,637 dated Nov. 12, 2020, 20 pgs.
Exam Communication issued by the European Patent Office for application 19782854.4 dated May 6, 2022.
Summons to Attend Oral Proceedings Pursuant to Rule 115(1) EPC for EP Application No. 19782854.4 dated Mar. 23, 2023.

\* cited by examiner

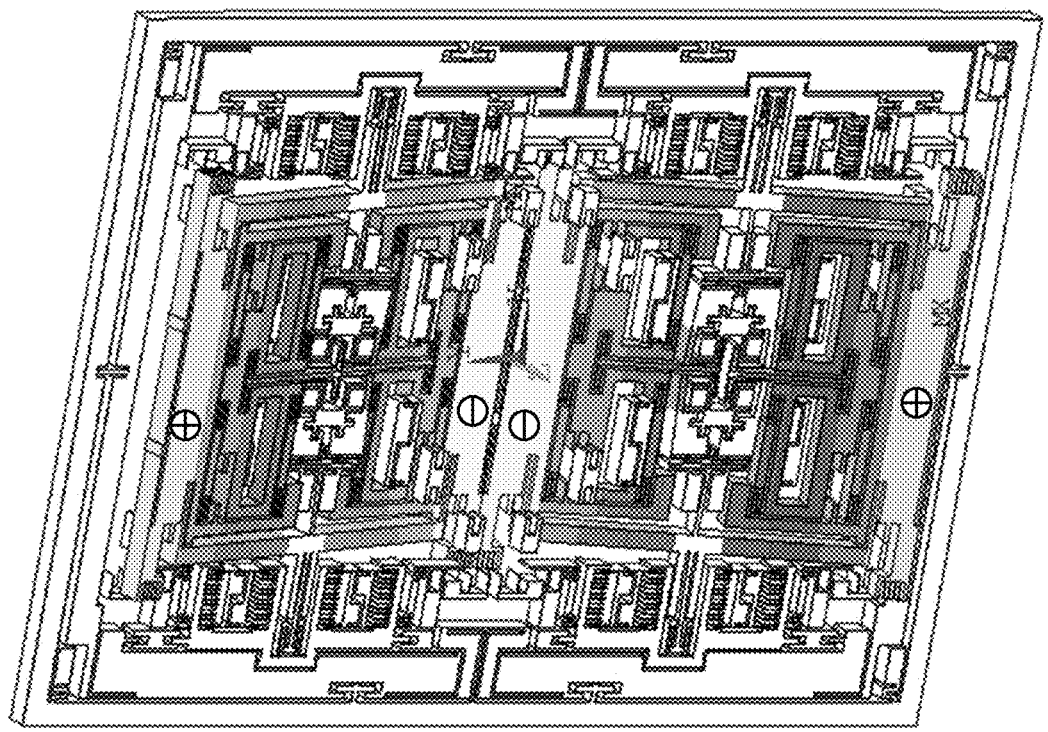
FIG. 10

DRIVE AND SENSE BALANCED, FULLY-COUPLED 3-AXIS GYROSCOPE

PRIORITY CLAIM

This patent application is a continuation application that claims priority to U.S. patent application Ser. No. 16/138,637, filed Sep. 21, 2018, entitled "DRIVE AND SENSE BALANCED, FULLY-COUPLED 3-AXIS GYROSCOPE," the entirety of which is incorporated by reference herein.

TECHNICAL FIELD

The present invention relates generally to angular velocity sensors and more particularly relates to angular velocity sensors that include guided mass systems.

BACKGROUND

Sensing of angular velocity is frequently performed using vibratory rate gyroscopes. Vibratory rate gyroscopes broadly function by driving the sensor into a first motion and measuring a second motion of the sensor that is responsive to both the first motion and the angular velocity to be sensed.

In addition, conventional vibratory rate microelectromechanical systems (MEMS) gyroscopes may not provide adequate solutions that reduce sensitivity to vibration and part-to-part coupling, reduce levitation force induced in-phase offset shift, and/or reduce sensitivity to package stress.

Accordingly, what is desired is to provide a system and method that overcomes the above issues. The present invention addresses such a need.

The above-described deficiencies are merely intended to provide an overview of some of the problems of conventional implementations, and are not intended to be exhaustive. Other problems with conventional implementations and techniques, and corresponding benefits of the various aspects described herein, may become further apparent upon review of the following description.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

Linear and angular momentum balanced 3-axis gyroscope architectures for better offset stability, vibration rejection, and lower part-to-part coupling are disclosed. In non-limiting embodiments, a linear and angular momentum balanced 3-axis gyroscope architecture is described, which can comprise one or more inner frame gyroscopes, two or more drive shuttles coupled to the one or more inner frame gyroscopes, two or more proof masses coupled to the inner frame gyroscopes, and/or one or more outer frame gyroscope or saddle gyroscope coupled to the inner frame gyroscopes.

Various embodiments described herein can facilitate providing linear and angular momentum balanced 3-axis gyroscope architectures for better offset stability, vibration rejection, and lower part-to-part coupling. Further non-limiting embodiments can be directed to methods associated with various embodiments described herein.

These and other embodiments are described in more detail below.

BRIEF DESCRIPTION OF THE DRAWINGS

Various non-limiting embodiments are further described with reference to the accompanying drawings, in which:

FIG. 10 depicts an exemplary GY mode shape of a non-limiting embodiment of an exemplary gyroscope architecture, according to still further non-limiting aspects described herein;

DETAILED DESCRIPTION

Figure 1:
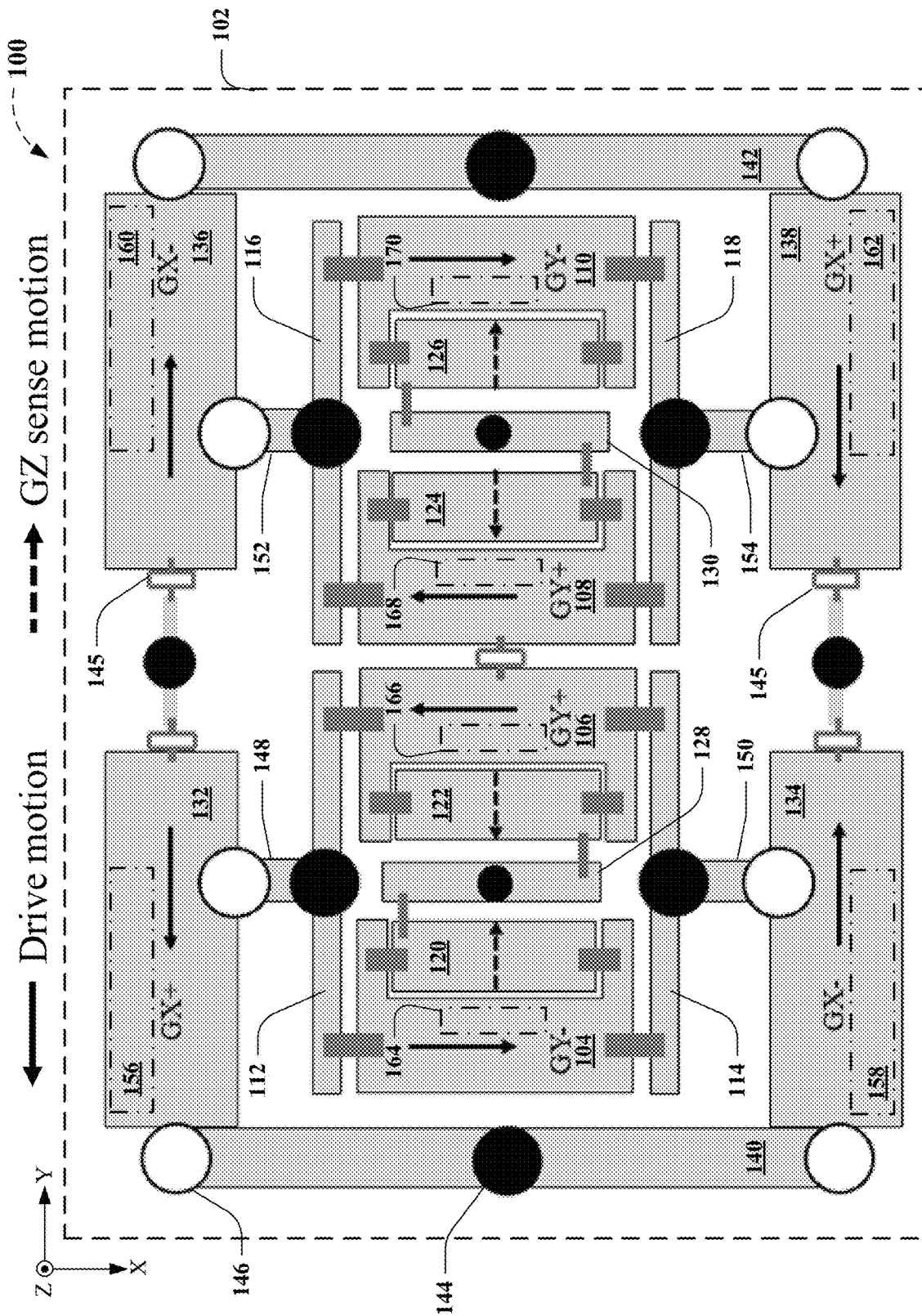
FIG. 1 illustrates a functional block diagram of non-limiting embodiments of an exemplary gyroscope architecture, according to non-limiting aspects of the subject disclosure.

The present invention relates generally to angular velocity sensors and more particularly relates to angular velocity sensors that include guided mass systems. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein. Accordingly, while a brief overview is provided, certain aspects of the subject disclosure are described or depicted herein for the purposes of illustration and not limitation. Thus, variations of the disclosed embodiments as suggested by the disclosed apparatuses, systems, and methodologies are intended to be encompassed within the scope of the subject matter disclosed herein.

As noted above, conventional MEMS vibratory rate gyroscopes may not provide adequate solutions that reduce sensitivity to vibration (e.g., linear vibration and/or angular vibration) and part-to-part coupling, reduce levitation force induced in-phase offset shift, and/or reduce sensitivity to package stress. Various embodiments described herein can overcome one or more of these and/or related drawbacks of conventional MEMS vibratory rate gyroscopes.

The subject disclosure provides exemplary 3-axis (e.g., GX, GY, and GZ) linear and angular momentum balanced vibratory rate gyroscope architectures with fully-coupled sense modes. In a non-limiting aspect, various exemplary embodiments can employ balanced drive and/or balanced sense components to reduce induced vibrations and/or part to part coupling, as described herein. In another non-limiting aspect, various exemplary embodiments can employ a stress isolation frame to reduce package induced stress, as further described herein. In yet another non-limiting aspect, various exemplary embodiments can employ mechanical coupling to facilitate linear vibration rejection. In still another non-limiting aspect, various exemplary embodiments can employ one or more drive shuttles to reject levitation force induced in-phase offset. In addition, various exemplary embodiments can facilitate fabrication of gyroscopes having improvements in cross-axis sensitivity due to decoupling of in-plane and out-of-plane gyroscopes, as described herein.

As a non-limiting example, exemplary embodiments can comprise two inner frame (e.g., GY) gyroscopes, wherein the inner frame gyroscopes facilitate GY sense mode and can facilitate drive system coupling, one outer frame (e.g., GX) gyroscope, wherein the outer frame gyroscope facilitates GX sense mode and can facilitate drive system coupling, four drive shuttles coupled to the two inner frame gyroscopes or outer frame gyroscope, four GZ proof masses coupled to the inner frame gyroscopes, and/or coupling mechanisms that facilitate coupling GZ proof masses, coupling the inner frame gyroscopes, and/or facilitate coupling the inner frame gyroscopes with the outer frame gyroscope and/or drive shuttles. In still further non-limiting aspects, various exemplary embodiments can be configured such that components can be removed from an exemplary overall architecture to fabricate a single axis or two axis gyroscope and/or can be configured such that a number of proof-masses can be reduced in half from an exemplary overall architecture to fabricate a half-gyroscope, as further described herein. For instance, according to a non-limiting aspect, an exemplary 3-axis (e.g., GX, GY, and GZ) gyroscope can be reduced to a 2-axis or 1-axis gyroscope by removing components from the architecture, employing fewer sense transducers, etc., and exemplary gyroscope architectures as described herein can be functionally cut in half to create a more compact 3-axis (e.g., GX, GY, and GZ, or fewer axes) gyroscope, by forgoing drive and/or sense balanced aspects of the exemplary 3-axis (e.g., GX, GY, and GZ) gyroscope architectures.

FIG. 1 illustrates a functional block diagram of non-limiting embodiments of an exemplary gyroscope architecture 100, according to non-limiting aspects of the subject disclosure. As a non-limiting example, exemplary embodiments of a gyroscope architecture 100 can comprise a MEMS device disposed in an X-Y plane parallel to a substrate 102 and can comprise two inner frame (e.g., GY) gyroscopes, that can each comprise two inner frame proof masses (e.g., GY proof masses 104, 106, 108, 110), coupled with lever arms 112, 114, 116, 118, wherein inner frame gyroscopes are configured to facilitate providing a GY sense mode, or measuring a component of angular velocity associated with the MEMS device around an axis (e.g., Y axis), and can be configured to couple the drive system with the inner frame gyroscopes. In a further non-limiting aspect, exemplary embodiments of a gyroscope architecture 100 can comprise a coupling mechanism that couples the two inner frame (e.g., GY) gyroscopes to each other. In a further non-limiting aspect, exemplary embodiments of a gyroscope architecture 100 can comprise a drive system comprising four drive shuttles (not shown), comprising guided masses and configured to be coupled to the two inner frame gyroscopes, respectively.

In another non-limiting aspect, exemplary gyroscope architecture 100 can comprise four GZ proof masses (e.g., GZ proof masses 120, 122, 124, 126), configured to be coupled to each other via coupling mechanisms 128 and 130 (e.g., via a spring and/or other coupling structures), respectively, wherein respective pairs of the four GZ proof masses (e.g., GZ proof masses 120, 122, 124, 126) are coupled to each other via coupling mechanisms or lever arms 128, 130 that are configured to couple the respective pairs of the four proof masses (e.g., GZ proof masses 120, 122, 124, 126) motions, and wherein the four GZ proof masses (e.g., GZ proof masses 120, 122, 124, 126) can be configured to facilitate providing a GZ sense mode, or measuring a component of angular velocity associated with the MEMS device around another axis (e.g., Z axis). In still another non-limiting aspect, exemplary gyroscope architecture 100 can comprise an outer frame or saddle (e.g., GX) gyroscope (e.g., GX) that can comprise two outer frame gyroscopes, comprising two pairs of two proof masses (e.g., GX proof mass 132, 134, 136, 138), wherein the GX, outer frame, or saddle gyroscope can be configured to facilitate providing a GX sense mode, or measuring a component of angular velocity associated with the MEMS device around another axis (e.g., X axis), can be configured to be coupled to the inner frame gyroscopes, respectively, and can be configured to couple the drive system with the outer frame gyroscopes, wherein respective pairs of two GX proof masses (e.g., GX proof mass 132/134, 136/138) can be configured to be coupled to each other, and wherein respective GX proof masses of the pairs (e.g., GX proof mass 132/134, 136/138) can be configured to be coupled to each other via respective outer frame lever arms 140/142.

In still other non-limiting aspects, exemplary gyroscope architecture 100 can comprise exemplary anchor points (e.g., depicted herein as rectangles with an X), which can facilitate anchoring various components to the substrate 102 and/or to an exemplary stress isolation frame (not shown) configured to be attached to the substrate 102 or package. In further non-limiting aspects, exemplary gyroscope architecture 100 of FIG. 1 is depicted comprising exemplary fixed pivot points 144 (e.g., black-filled circles), which can functionally represent a center about which various components can be configured to rotate (e.g., in a plane parallel to the X-Y plane of the substrate 102, in a plane orthogonal to the X-Y plane of the substrate 102, etc.), which can comprise exemplary anchor points, and comprising exemplary translating pivot points 146 (e.g., white-filled circles), which can functionally represent a pivot point or hinge about which various components can be configured to rotate and translate (e.g., in a plane parallel to the X-Y plane of the substrate 102, in a plane orthogonal to the X-Y plane of the substrate 102, etc.). These exemplary pivot points can be understood to be a functional representation of the centers of rotational motions as a result of the processes required to create such devices via MEMS fabrication, which typically comprise a set of springs, flexures, rigid bodies, or suspension mechanisms or components arranged to produce the desired motion, as further described herein.

Figure 3:
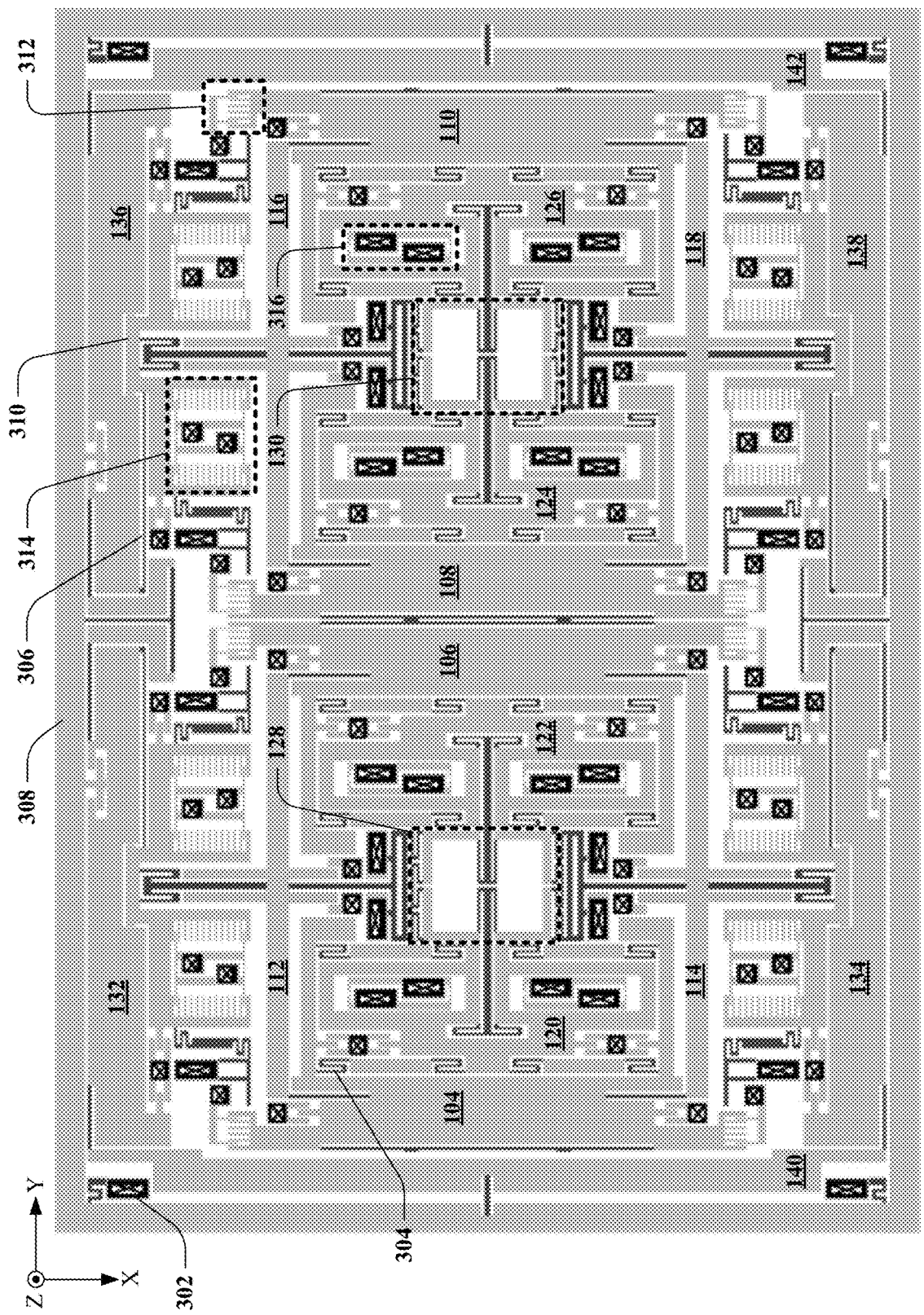
FIG. 3 depicts further aspects of non-limiting embodiments of an exemplary gyroscope architecture, as described herein.

Accordingly, exemplary gyroscope architecture 100 of FIG. 1 is depicted comprising exemplary springs (e.g., spring 145), suspension elements, or coupling mechanisms, which can comprise flexures or other structures that are particularly rigid, or flexibly and/or torsionally compliant in particular directions to constrain or define motions (e.g., to anti-phase motion, to in-plane motion, to guide mass motions of guided masses, etc.) and/or transfer motions of the various components of exemplary gyroscope architecture 100, suspend various components of exemplary gyroscope architecture 100 to exemplary anchor points 302, for example, as depicted in FIG. 3, function as exemplary fixed pivot points 144 and/or exemplary translating pivot points 146, and so on, as further described herein.

As a non-limiting example, exemplary gyroscope architecture 100 of FIG. 1 is depicted as comprising an outer frame or saddle (e.g., GX) gyroscope (e.g., GX, outer frame, or saddle gyroscope) that can comprise two GX outer frame gyroscopes, comprising two pairs of two proof masses (e.g., GX proof mass 132, 134, 136, 138), wherein the GX, outer frame, or saddle gyroscope can be configured to be coupled to the inner frame gyroscopes (e.g., via coupling 148/150), respectively, to lever arm 112/114 of exemplary GY frame gyroscope comprising GY proof masses 104, 106, thereby facilitating providing a fixed pivot point between lever arm 112/114 of exemplary GY frame gyroscope and GX proof masses 132/134. Likewise, exemplary GX, outer frame, or saddle gyroscope can be configured to be coupled to the inner frame gyroscopes (e.g., via coupling 152/154), respectively, to lever arm 116/118 of exemplary GY frame gyroscope comprising GY proof masses 108, 110, thereby facilitating providing a fixed pivot point between lever arm 116/118 of exemplary GY frame gyroscope and GX proof masses 136/138. Such exemplary coupling is shown schematically in FIGS. 3-6, for example.

As another non-limiting example, respective pairs of the four exemplary GZ proof masses (e.g., GZ proof masses 120, 122, 124, 126) can be coupled to each other via coupling mechanisms or lever arms 128, 130 that are configured to coupled the respective pairs of the four proof masses (e.g., GZ proof masses 120/122, 124/126) motions. For instance, exemplary GZ proof mass 120 is coupled to exemplary GZ proof mass 122 via coupling mechanisms or lever arm 128 and configured to force the respective pair of the four proof masses (e.g., exemplary GZ proof mass 120/122) into anti-phase motion, generally in an X-Y plane, parallel to exemplary substrate 102, as a result of a component of angular velocity associated with the MEMS device around the Z-axis. Such exemplary coupling is shown in FIG. 1 functionally as a rotation of coupling mechanisms or lever arm 128 about a fixed pivot point, centered on coupling mechanisms or lever arm 128, and is shown schematically in FIGS. 3-6, for example.

As another non-limiting example, the two exemplary inner frame gyroscopes can be configured to be coupled to each other (e.g., shown functionally via a spring coupling exemplary GY proof mass 106 to exemplary GY proof mass 108, such as shown schematically as spring 145 of FIG. 1 associated with GX proof mass 136) to facilitate constraining a motion associated with the two GY or inner frame gyroscopes into a condition of linear and angular momentum balance. For instance, as further described herein exemplary GY proof mass 106 can be coupled to exemplary GY proof mass 108 via a spring or other structure or combination of structures that can facilitate constraining a motion associated with the two inner frame gyroscopes into a condition of linear and angular momentum balance, as further described herein. Such coupling is shown schematically in FIGS. 3-6, for example. In another non-limiting example, the two exemplary GX, or outer frame (saddle) gyroscopes, each comprising two proof masses (e.g., GX proof mass 132, 134, 136, 138) can be coupled, respectively, to the two exemplary GY or inner frame gyroscopes, and/or can be configured to couple the two exemplary GX, outer frame, or saddle gyroscope to the four drive shuttles (not shown), as further described herein. For instance, such a coupling is shown in FIG. 3, schematically, as the GY proof masses 108/110 (104/106) between GX proof masses 136 and 138 (132 and 134) (e.g., via springs, flexures, drive shuttles, lever arms 112, 114, 116, 118, etc.), thereby providing an axis of rotation for the GY proof masses 104, 106, 108, 110 transverse across the GX proof masses 132, 134, 136, 138, while transferring respective motions of the GY proof masses 104 and 106 (108 and 110) to the GX proof masses 132, 134, 136, 138. Such exemplary coupling is shown schematically in FIGS. 3-6, for example.

In addition, exemplary gyroscope architecture 100 of FIG. 1 is depicted comprising various sense electrodes or transducer elements, which can be respectively configured to detect motions of the various proof masses or other components of the exemplary gyroscope architecture 100, for example, to detect motions as a result of Coriolis forces induced on the various proof masses to provide a measure of the angular velocity about the X, Y, or Z axes, to detect drive motions, etc. Although electrostatic actuators and transducers are described throughout this specification, one of ordinary skill in the art recognizes that a variety of actuators and/or transducers could be utilized for these functions, and that use would be within the spirit and scope of the subject disclosure. For example, exemplary actuators and/or transducers could comprise piezoelectric, thermal, electromagnetic, actuators and/or transducers, or the like. In a non-limiting aspect, exemplary gyroscope architecture 100 can comprise capacitive electrodes 156, 158, 160, 162, configured to respectively detect motions of exemplary GX proof masses 132, 134, 136, 138, and can comprise capacitive electrodes 164, 166, 168, 170 configured to respectively detect motions of exemplary GY proof masses 104, 106, 108, 110, and so on. As further described herein, it can be understood that exemplary capacitive electrodes 156, 158, 160, 162, 164, 166, 168, 170 can be configured to primarily facilitate detection of Coriolis forces acting on respective proof masses as a result of angular velocity associated with the MEMS device about respective axes (e.g., X or Y axes). As further described herein, these Coriolis forces acting on respective proof masses as a result of angular velocity associated with the MEMS device about respective axes (e.g., X or Y axes) can result in out-of-plane motions of the respective proof masses, wherein the out-of-plane motion is defined as motion in the direction of the Z axis (e.g., out of the X-Y plane).

Figure 2:
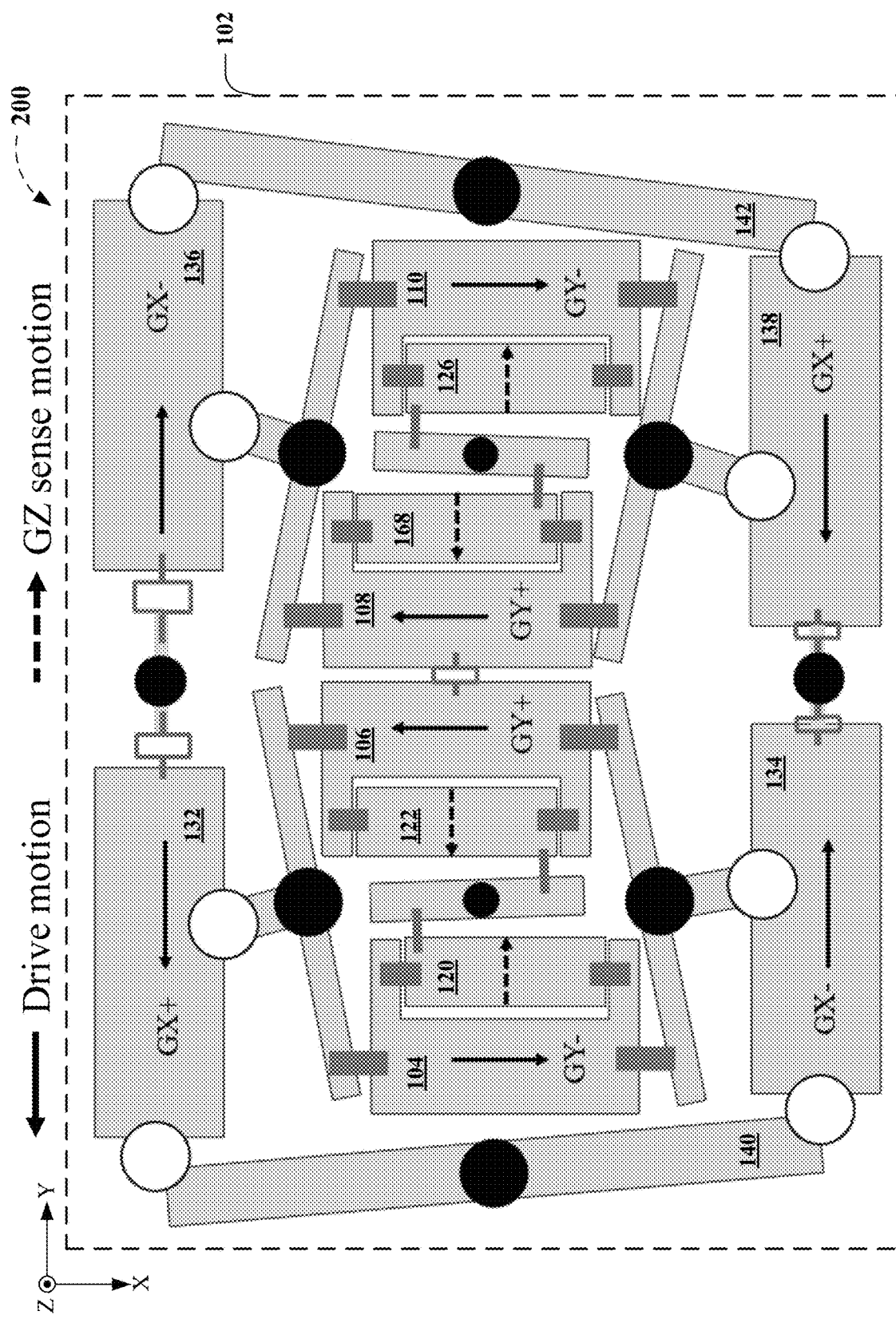
FIG. 2 illustrates a functional block diagram of non-limiting embodiments (e.g., corresponding FIG. 10) of an exemplary gyroscope architecture in driven motion, which demonstrates further non-limiting aspects of the subject disclosure.

In addition, exemplary gyroscope architecture 100 of FIG. 1 is depicted as undergoing drive motion in FIG. 2, at a particular instance in time, which is indicated by a solid arrow in the direction of the respective various components of exemplary gyroscope architecture 100. As further described herein, to generate the drive motion, an electrostatic force can be applied with exemplary drive combs (not shown) that can be coupled to exemplary drive shuttles (not shown), respectively, which exemplary drive shuttles can comprise the guided masses configured to be coupled to the two inner frame gyroscopes, the GX, outer frame, or saddle gyroscope, and/or combinations, or portions thereof, as described herein. By applying an alternating current (AC) voltage to the respective exemplary drive combs (not shown) at a drive frequency, an electrostatic force can be applied via the exemplary drive combs (not shown) to the exemplary drive shuttles (not shown) to generate the drive force at the drive frequency, which can result in the drive motions of the respective various components of exemplary gyroscope architecture 100 as indicated in FIG. 1. This drive force applied to respective exemplary drive shuttles (not shown) is configured to be transferred to the various components of exemplary gyroscope architecture 100, via the above described coupling mechanisms, lever arms, pivot points, and springs, as described above, which results in the drive motions of the various components of exemplary gyroscope architecture 100, as depicted in FIG. 1, and which results in the translation of the various components of exemplary gyroscope architecture 100, as depicted in FIG. 2. Note that FIG. 2 depicts deflection of various components of exemplary gyroscope architecture 100 as a result of a Coriolis force from angular velocity about the respective axes with the given direction of drive motion as positive (e.g., GX+, GY+), or above the X-Y plane of the MEMS device, and as negative (e.g., GX−, GY−), or below the X-Y plane of the MEMS device.

Note that, as described above, the four exemplary GZ proof masses (e.g., GZ proof masses 120, 122, 124, 126) are configured to be coupled (e.g., via a spring or other coupling structure) to the four GY proof masses 104, 106, 108, 110, respectively, wherein respective pairs of the four GZ proof masses (e.g., GZ proof masses 120, 122, 124, 126) are coupled to each other via coupling mechanisms or lever arms 128, 130 that are configured to couple the respective pairs of the four proof masses (e.g., GZ proof masses 120, 122, 124, 126) motions. As further described herein, a Coriolis force acting on respective GZ proof masses (e.g., GZ proof masses 120, 122, 124, 126) as a result of angular velocity associated with the MEMS device about the Z axis can result in motions of the respective GZ proof masses (e.g., GZ proof masses 120, 122, 124, 126), generally in-plane, wherein the in-plane motion is defined as motion in the direction of the X axis (e.g., in the X-Y plane), as depicted. Accordingly, respective GZ proof masses (e.g., GZ proof masses 120, 122, 124, 126) of exemplary gyroscope architecture 100 of FIG. 1 is depicted as experiencing a sensed motion, at a particular instance in time, which is indicated by a dashed arrow in the direction of the respective various components of exemplary gyroscope architecture 100 in FIG. 2.

Thus, as a further non-limiting example, exemplary gyroscope architecture 100 can comprise further capacitive electrodes (not shown) that can be configured to respectively detect motions of respective GZ proof masses (e.g., GZ proof masses 120, 122, 124, 126). As further described herein, it can be understood that such exemplary capacitive electrodes can be configured to primarily facilitate detection of Coriolis forces acting on respective proof masses as a result of angular velocity associated with the MEMS device about the Z axis. As described above, although the transducers, electrodes, or actuators (e.g., drive combs) are described above as capacitive transducers, electrodes, or actuators, various types of transducers, electrodes, or actuators could be utilized including, but not limited to piezoelectric, thermal, electromagnetic, optical, or the like, as appropriate, and its use would be within the spirit and scope of the disclosed subject matter.

FIG. 2 illustrates a functional block diagram 200 of non-limiting embodiments (e.g., corresponding FIG. 1) of an exemplary gyroscope architecture in driven motion, which demonstrates further non-limiting aspects of the subject disclosure. FIG. 2 depicts resulting translation and rotation motions of the various components of exemplary gyroscope architecture 100 as a result of drive force applied to respective exemplary drive shuttles (not shown) and transferred to the various components of exemplary gyroscope architecture 100, via the above described coupling mechanisms, lever arms, pivot points, and springs, as described above. Note further that some reference characters and/or components of exemplary gyroscope architecture 100, as depicted in FIG. 1, are not shown in functional block diagram 200, for clarity.

Several points are apparent from a review of FIGS. 1-2. First, note that the drive motions of the respective proof masses and components are linear and/or angular momentum balanced, according to various non-limiting embodiments. That is, drive motion of exemplary drive shuttles (not shown) can be in anti-phase motion or opposite directions, as further described herein. Secondly, drive motions of the two inner frame gyros are also anti-phase or in opposite directions, which is facilitated by the coupling of the anti-phase drive motion of the four exemplary drive shuttles (not shown) to the GY proof masses (e.g., GY proof masses 104, 106, 108, 110) via the respective exemplary lever arms 112, 114, 116, 118 that provides rotation about the fixed pivot points and translation of the X proof masses (e.g., GX proof masses 132, 134, 136, 138) via the pivot points, and which is facilitated by coupling the two exemplary GY or inner frame gyroscopes to each other (e.g., shown functionally via a spring coupling exemplary GY proof mass 106 to exemplary GY proof mass 108, such as shown schematically as spring 145 of FIG. 1 associated with GX proof mass 136). Thus, the two inner frame gyroscopes comprise a four bar system that deforms into a parallelogram under applied drive motion. In addition, the coupling of the exemplary GX, outer frame, or saddle gyroscope to the respective GY or inner frame gyroscopes ensures that the drive motions of the GX, outer frame, or saddle gyroscope are also anti-phase or in opposite directions. Lastly, note that drive motions of the four exemplary GZ proof masses (e.g., GZ proof masses 120, 122, 124, 126) coupled (e.g., via a spring or other coupling structure) to the GY proof masses (e.g., GY proof masses 104, 106, 108, 110), respectively, are also anti-phase or in opposite directions. As a result, the drive motion of the 3-axis (e.g., GX, GY, and GZ) gyroscope depicted in FIGS. 1-2 can benefit from linear and angular momentum balance, according to exemplary aspects described herein.

According to various non-limiting embodiments, by employing balanced masses, arranged such that their drive motions are opposite to each other and such that their net linear momentum and angular momentum from drive motion are zero, vibration rejection can be improved. For example, by coupling various components of exemplary gyroscope architecture 100, these various components do not move independently of each other. As used herein, motion in same direction is referred to as common motion, or common mode, and motion in opposite direction is referred to as anti-phase motion, or differential motion. It can be that understood common motion is susceptible to acceleration from outside sources, such as vibration, where acceleration can be thought of as a uniform body load. And because it is uniform, it is by definition in one direction, or linear acceleration. This linear acceleration will excite common motion. However, because the various drive motions are coupled, physically, to ensure it is anti-phase (not common) or in opposite directions, a uniform body load or linear acceleration will not create a motion in the sense mode, which improves ability to reject vibration, in various non-limiting aspects. Moreover, by employing balanced masses, arranged such that their drive motions are opposite to each other and such that their net linear momentum and angular momentum from drive motion are zero, torque applied to a device package at the drive frequency to the printed circuit board (PCB) can be minimized. Thus, in exemplary implementations where multiple MEMS gyroscope devices are mounted to the same PCB, where resonant frequencies are close to each other, exemplary devices as described herein can minimize cross-talk, or part to part coupling, that might otherwise result in undesirable noise and offsets on the devices experiencing cross-talk as a result of unbalanced masses or momentum.

Note that, as in FIG. 1, FIG. 2 depicts deflection of various components of exemplary gyroscope architecture 100 as a result of a Coriolis force from angular velocity about the respective axes with the given direction of drive motion as positive (e.g., GX+, GY+), or above the X-Y plane of the MEMS device, and as negative (e.g., GX−, GY−), or below the X-Y plane of the MEMS device. Thus, it can be seen in FIGS. 1-2, under the given drive motion, a Coriolis force from angular velocity about the respective axes with the given direction of drive motions will result in out-of-plane (e.g., out of X-Y plane) deflection of the GY or inner frame gyroscopes and the GX, outer frame, or saddle gyroscope. As described above, exemplary capacitive electrodes 156, 158, 160, 162, 164, 166, 168, 170 can be configured to primarily facilitate detection of Coriolis forces acting on respective proof masses as a result of angular velocity associated with the MEMS device about respective axes (e.g., X or Y axes).

However, note further that the four exemplary GZ proof masses (e.g., GZ proof masses 120, 122, 124, 126) are coupled (e.g., via a spring or other coupling structure) to the GY proof masses (e.g., GY proof masses 104, 106, 108, 110), respectively, wherein respective pairs of the four exemplary GZ proof masses (e.g., GZ proof masses 120, 122, 124, 126) are coupled to each other via coupling mechanisms or lever arms 128, 130 that are configured to couple the respective pairs of the four proof masses (e.g., GZ proof masses 120, 122, 124, 126) motions. Thus, the drive motions of the four exemplary GZ proof masses (e.g., GZ proof masses 120, 122, 124, 126) is in the Y direction, and a Coriolis force from angular velocity about the Z axis with the given direction of drive motions will result in-plane (e.g., in the X-Y plane) deflection in the X direction. Thus, exemplary gyroscope architecture 100 can comprise further capacitive electrodes (not shown) that can be configured to respectively detect motions of respective GZ proof masses (e.g., GZ proof masses 120, 122, 124, 126) to primarily facilitate detection of Coriolis forces acting on respective proof masses as a result of angular velocity associated with the MEMS device about the Z axis.

Figure 11:
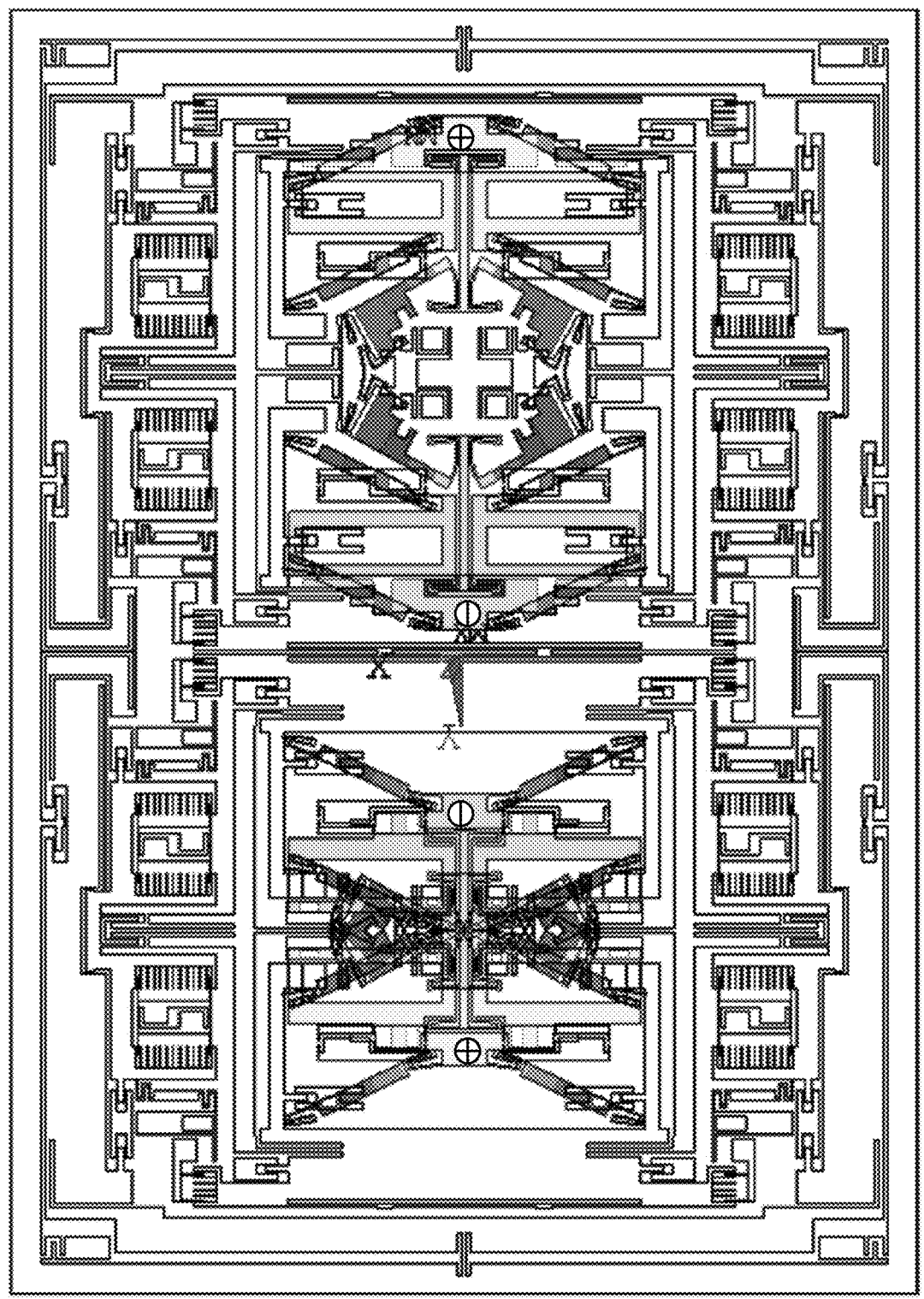
FIG. 11 depicts an exemplary GZ sense mode shape of a non-limiting embodiment of an exemplary gyroscope architecture, according to non-limiting aspects described herein.
Figure 12:
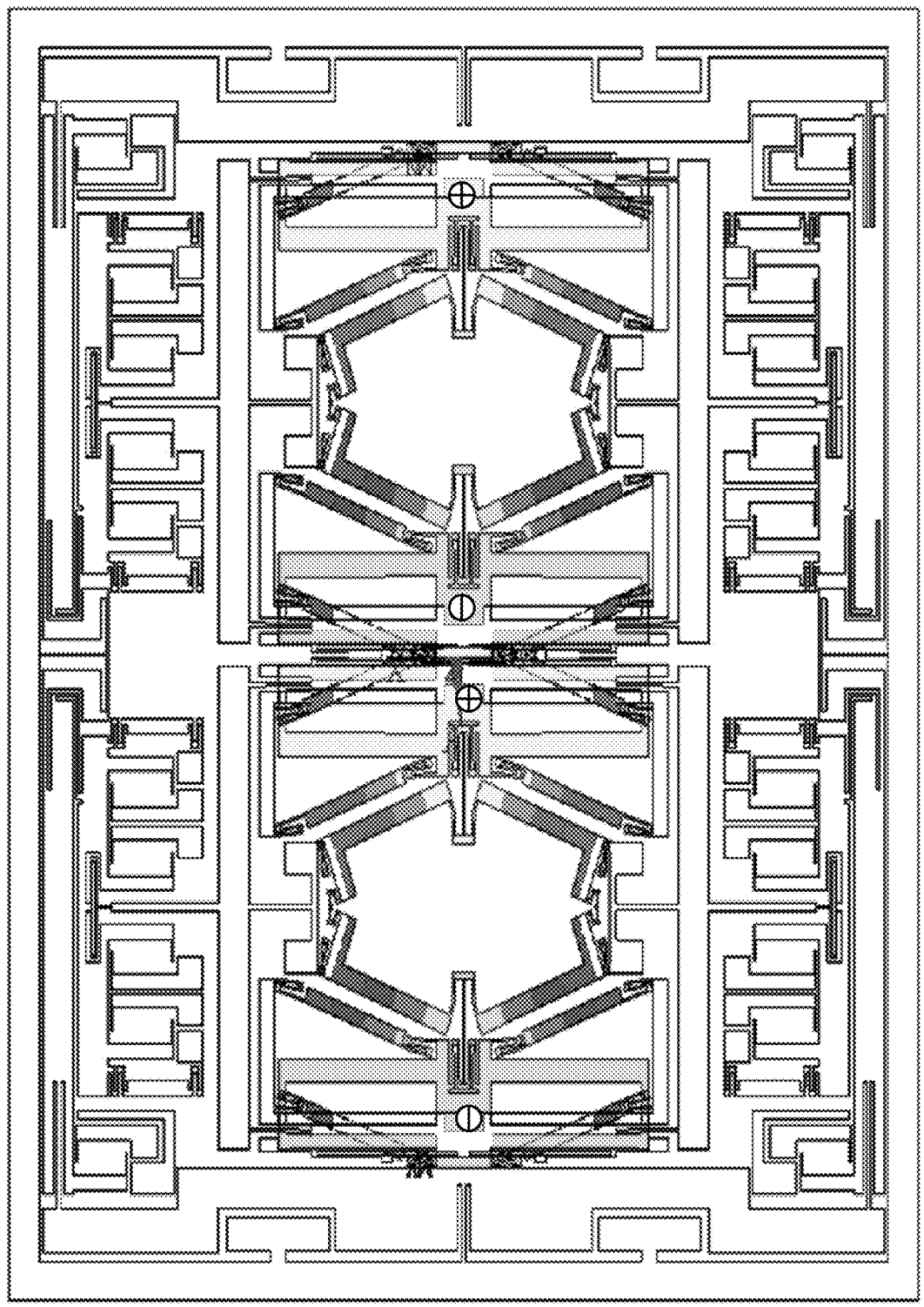
FIG. 12 depicts an exemplary GZ parasitic mode shape of a non-limiting embodiment of an exemplary gyroscope architecture, according to still further non-limiting aspects described herein.

Note regarding FIGS. 1-2 that an exemplary drive system can be decoupled from exemplary GX, outer frame, or saddle gyroscope and/or the exemplary GY or inner frame gyroscopes, such that the drive motion on both the exemplary GX, outer frame, or saddle gyroscope and the exemplary GY or inner frame gyroscopes can be symmetric, and/or the GZ gyroscopes comprising the GZ proof masses (e.g., GZ proof masses 120, 122, 124, 126) can be configured such that compliance of the GZ gyroscopes comprising the GZ proof masses (e.g., GZ proof masses 120, 122, 124, 126) to out-of-plane motion can be made very stiff, according to various non-limiting aspects. However, as depicted in FIGS. 11-12, for example, note that exemplary embodiments as described herein can experience parasitic modes on GZ sense modes, in a further non-limiting aspect.

As noted above, conventional MEMS vibratory rate gyroscopes may not provide adequate solutions that reduce sensitivity to vibration (e.g., linear vibration and/or angular vibration) and part-to-part coupling, reduce levitation force induced in-phase offset shift, and/or reduce sensitivity to package stress. However, according to various non-limiting implementations, as described herein, by placing the exemplary drive system in exemplary drive shuttles (not shown), and by employing weak coupling between the out-of-plane gyroscopes (e.g., GY or inner frame gyroscopes and GX, outer frame, or saddle gyroscope), various non-limiting embodiments can facilitate minimizing the out-of-plane or levitation force transferred to the GZ gyroscopes, and/or it can be rejected. In addition, decoupling of in-plane and out-of-plane gyroscopes can result in improvements in cross-axis sensitivity.

This can result in better offset stability, because, being a sensor that measures a quantity of interest, e.g., angular velocity about the Z axis by detection of the Coriolis force on the four exemplary GZ proof masses (e.g., GZ proof masses 120, 122, 124, 126), the sensor is expected to output a signal that is proportional to the angular velocity. By decoupling or employing weak coupling between the out-of-plane gyroscopes (e.g., GY or frame gyroscopes and GX, outer frame, or saddle gyroscope) and the in-plane gyroscopes (e.g., GZ gyroscope), the offset or bias error, which is how much shift there is between the quantity of interest and the quantity being reported (e.g., Coriolis force as a result of angular velocity about the z-axis), there will be reduced out-of-plane force (or levitation force) on the GZ gyroscope, which might otherwise be sensed as an applied angular velocity.

For example, various embodiments described herein can reduce levitation force induced in-phase offset shift via employment of exemplary drive shuttles (not shown) on the GX and/or GY gyroscopes. For instance, as described above, GY or inner frame gyroscopes and GX, outer frame, or saddle gyroscope are out-of plane gyroscopes, where MEMS device rotation around the X or Y axes will result in out-of-plane motion of the GY proof masses (e.g., GY proof masses 104, 106, 108, 110) and GX proof masses (e.g., GX proof masses 132, 134, 136, 138). Rotation of the MEMS device around the Z axis will only result in motion of the four exemplary GZ proof masses (e.g., GZ proof masses 120, 122, 124, 126) in-plane or parallel to the X-Y plane, which is the plane of the MEMS device, as a result of coupling four exemplary GZ proof masses (e.g., GZ proof masses 120, 122, 124, 126) to each other via coupling mechanisms or lever arms 128, 130. By constraining the motions of the in-plane motion components (GZ) separately from the out-of-plane motion components (GX, GY), and by connecting the out-of-plane motion components (GX, GY) with the flexible coupling mechanism (e.g., via coupling 148, 150, 152, 154), the in plane motion components (GZ) (e.g., GZ proof masses 120, 122, 124, 126), the transmission of the levitation force (and associated offset shift) associated with the out-of-plane motion components (GX, GY) can be minimized.

FIG. 3 depicts further aspects of non-limiting embodiments of an exemplary gyroscope architecture 100, as described herein. Note the relative locations and configurations of the exemplary GY proof masses (e.g., GY proof masses 104, 106, 108, 110), exemplary GX proof masses (e.g., GX proof masses 132, 134, 136, 138), the coupling there between, exemplary lever arms 112, 114, 116, 118, anchors 302, and various springs 145 (e.g., GZ spring 304, etc.), couplings (e.g., GX or outer frame gyro to drive shuttle coupling 306, etc.), suspension elements, etc. depicted therein.

In addition, FIG. 3 depicts an exemplary stress isolation frame 308, according to further non-limiting aspects. Recall that offset shift can be induced by levitation force induced in the drive shuttles or induced by deformation of the gyroscope structure due to external stresses (e.g., package stresses). Offset shift can also be affected by other sources such as package stress, temperature effects, etc. In order to decouple package deformation from exemplary devices and, thus, minimize package deformation induced offset, an exemplary stress isolation frame 308 can be employed in various non-limiting embodiments. While not shown in FIG. 1, an exemplary stress isolation frame 308 can be shown connected to all the outer anchor points 302 illustrated in FIG. 3. Here, note that the exemplary stress isolation frame 308 can be connected to the package or the substrate 102, and the peripheral components of the components of exemplary gyroscope architecture 100 can be suspended therefrom and/or anchored to, including, but not limited to the four exemplary drive shuttles 310, exemplary coupling mechanisms or lever arms 128, 130, etc. As a result, package bend or deformation sensitivity can be improved, according to further non-limiting aspects, wherein offset resulting from bending of a package associated with the MEMS device can be reduced by employing one or more of an exemplary stress isolation frame 308, along with exemplary drive shuttles 310, etc., as described herein.

FIG. 3 further depicts exemplary drive sense combs 312, which can be configured to detect drive motion. Note that, while exemplary drive sense combs 312 are depicted as coupled to GY or inner frame gyroscope components (e.g., GY proof masses 104, 106, 108, 110), in non-limiting embodiments, in further non-limiting embodiments, exemplary drive sense combs 312 can be coupled to other of the various components of the exemplary gyroscope architecture 100, including, but not limited to, one or more of the four exemplary drive shuttles 310, etc. FIG. 3 further depicts exemplary drive combs 314, which can be coupled to the exemplary drive shuttles 310 to generate the drive force at the drive frequency, and which can result in the drive motions of the respective various components of exemplary gyroscope architecture 100, as described above regarding FIGS. 1-2. In addition, FIG. 3 depicts further capacitive electrodes 316 that can be configured to respectively detect motions of respective GZ proof masses (e.g., GZ proof masses 120, 122, 124, 126), as further described above regarding FIGS. 1-2.

Figure 4:
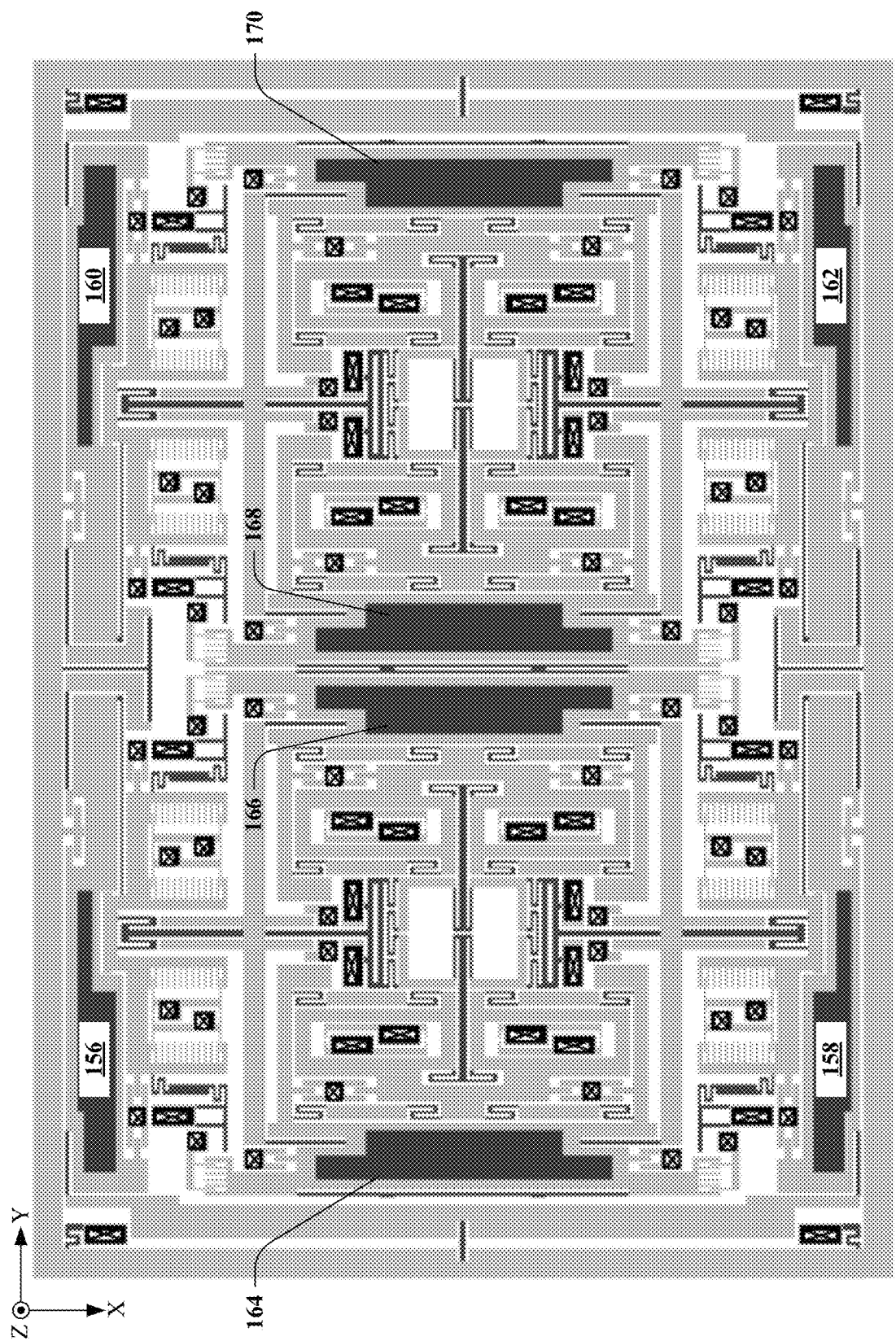
FIG. 4 depicts still further exemplary aspects of non-limiting embodiments of an exemplary gyroscope architecture.

FIG. 4 depicts still further exemplary aspects of non-limiting embodiments of an exemplary gyroscope architecture 100. For instance, FIG. 4 depicts relative locations of exemplary capacitive electrodes 156, 158, 160, 162, 164, 166, 168, 170, in the depiction of FIG. 3, which can be configured to primarily facilitate detection of Coriolis forces acting on respective proof masses as a result of angular velocity associated with the MEMS device about respective axes (e.g., X or Y axes), for example, as further described above regarding FIG. 1.

Figure 5:
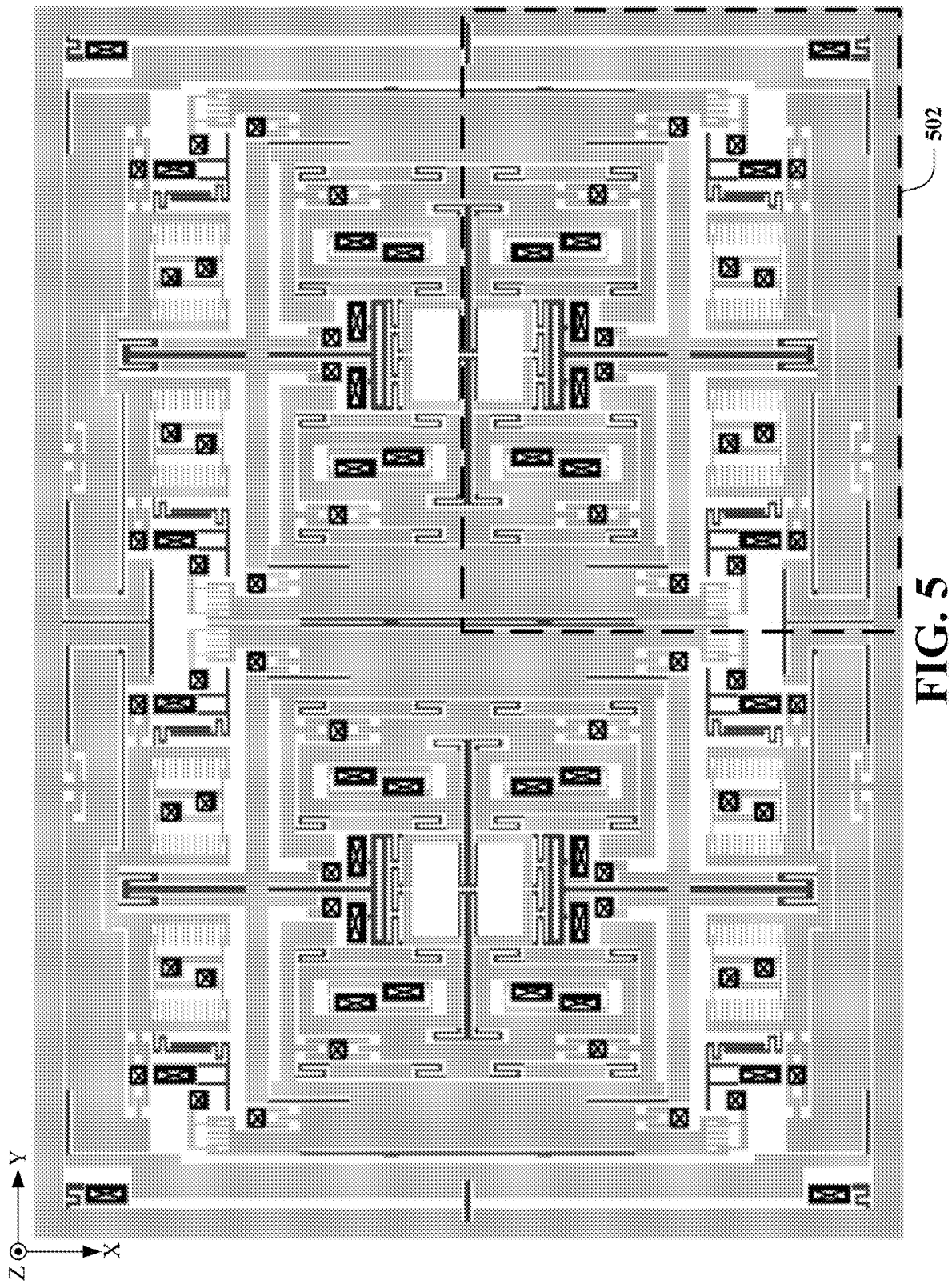
FIG. 5 depicts still further exemplary aspects of non-limiting embodiments of an exemplary gyroscope architecture.
Figure 6:
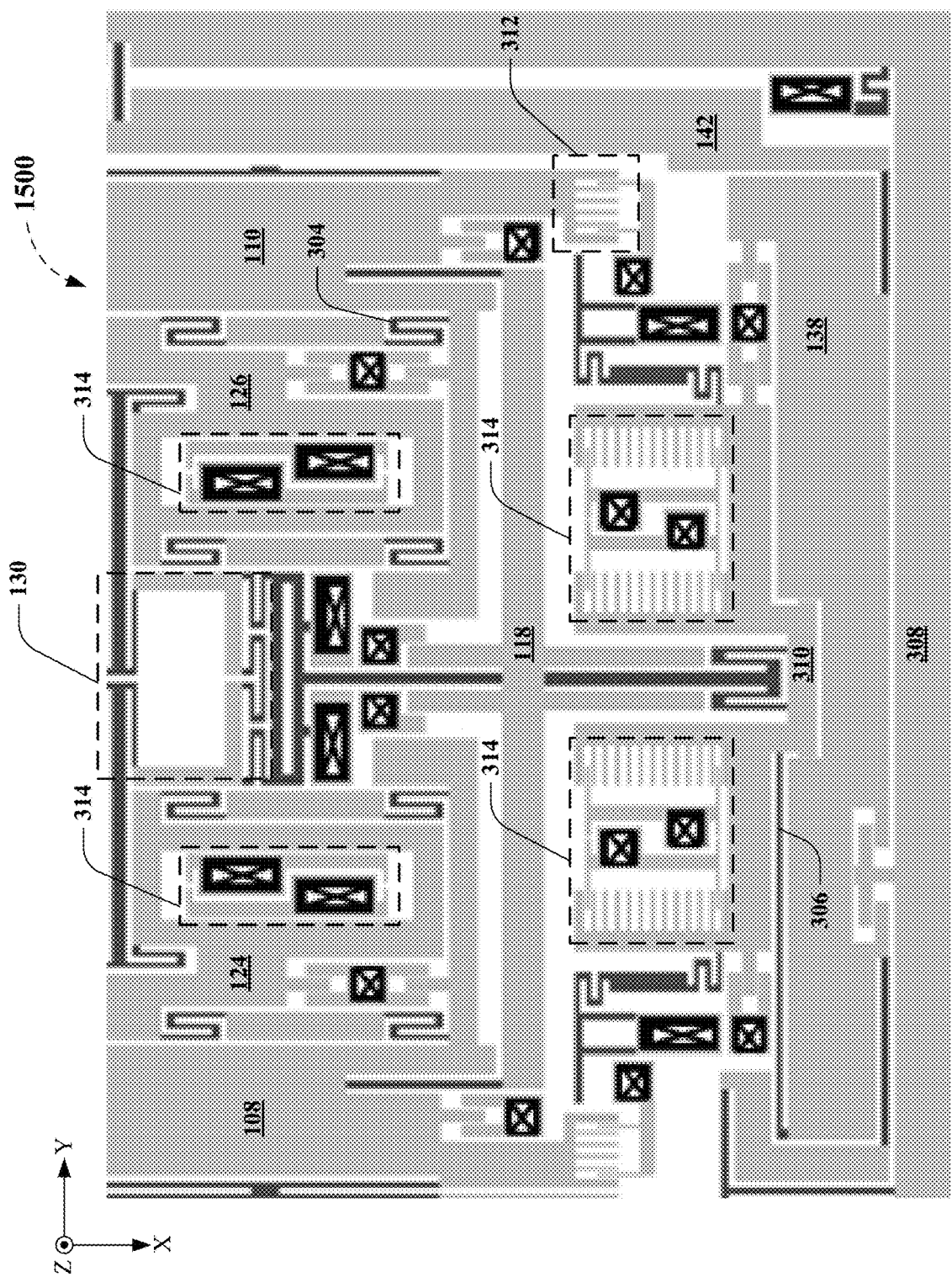
FIG. 6 depicts still further exemplary aspects of non-limiting embodiments of an exemplary gyroscope architecture.
Figure 7:
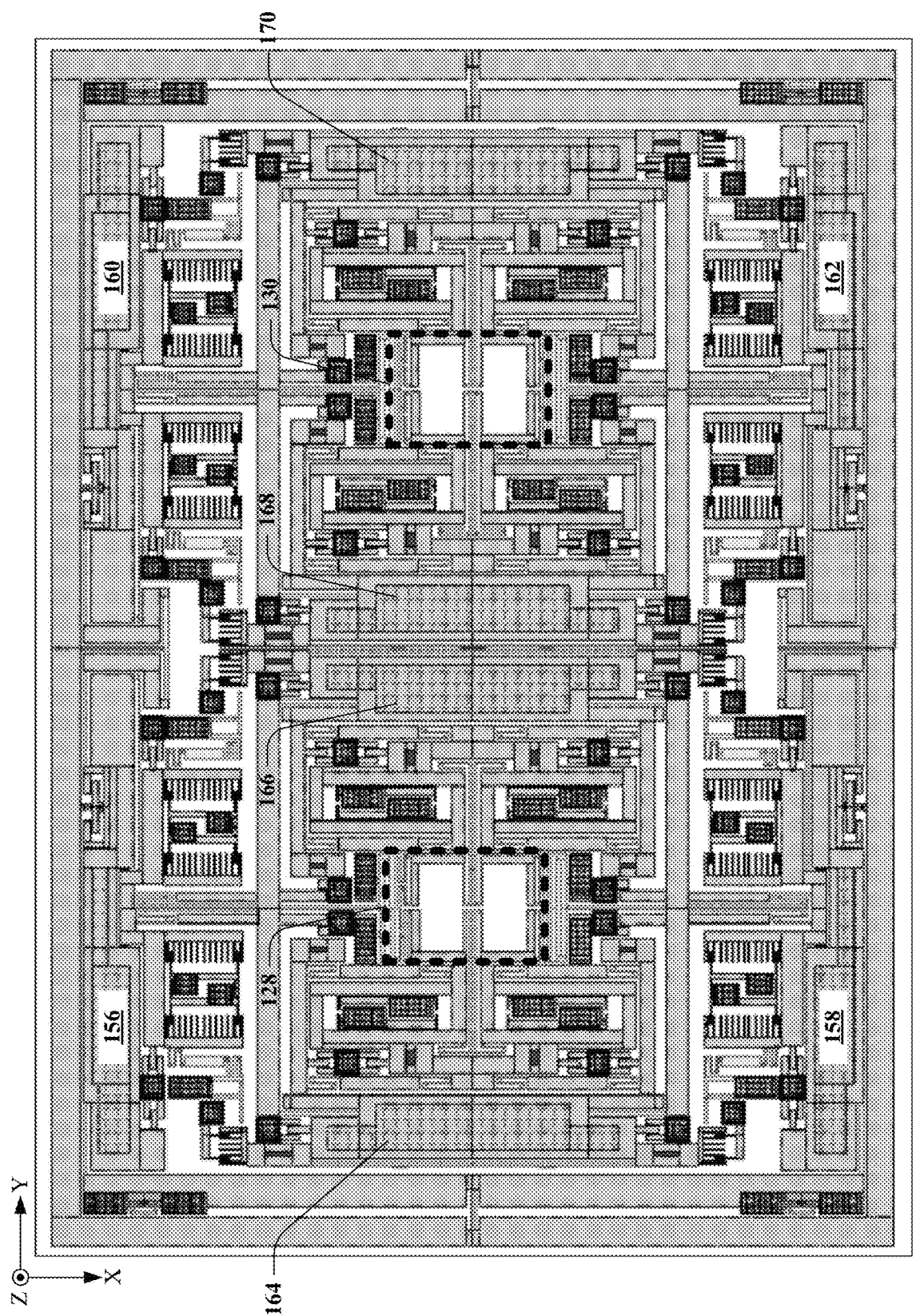
FIG. 7 depicts yet another non-limiting embodiment of an exemplary gyroscope architecture, according to non-limiting aspects of the subject disclosure.

FIG. 5 depicts still further exemplary aspects of non-limiting embodiments of an exemplary gyroscope architecture 100. Note that in FIG. 5, anchor 302 locations are depicted as black boxes, instead of as in FIGS. 1-2. FIG. 5 depicts inset 502, which is further described, regarding FIG. 6. For example, FIG. 6 depicts still further exemplary aspects of non-limiting embodiments of an exemplary gyroscope architecture 100. FIG. 6 depicts the relative locations and configurations of various components of exemplary gyroscope architecture 100, as depicted in FIGS. 1-5, for inset 502. FIG. 7 depicts yet another non-limiting embodiment of an exemplary gyroscope architecture 100, depicting relative locations of exemplary capacitive electrodes 156, 158, 160, 162, 164, 166, 168, 170, in the depiction of FIG. 7, which can be configured to primarily facilitate detection of Coriolis forces acting on respective proof masses as a result of angular velocity associated with the MEMS device about respective axes (e.g., X or Y axes), for example, as further described above regarding FIGS. 1, 4, etc. Note further the fabrication design of the coupling mechanisms or lever arms 128, 130 that are configured to couple the respective pairs of the four proof masses (e.g., GZ proof masses 120, 122, 124, 126) motions, which corresponds respectively to construction of a functional fixed pivot point between respective pairs of GZ proof masses, as described above regarding FIGS. 1-2.

Figure 8:
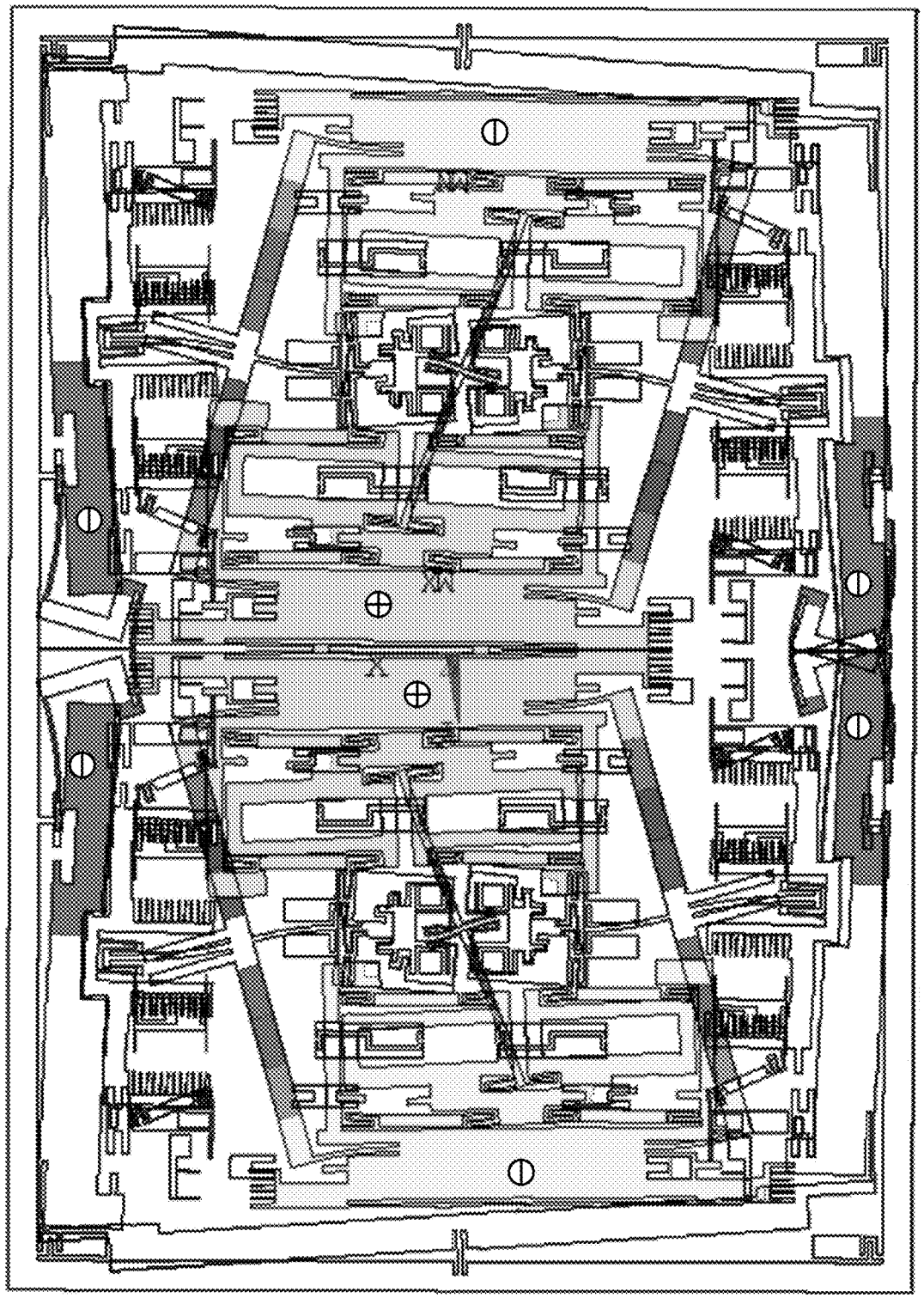
FIG. 8 depicts an exemplary drive mode shape of a non-limiting embodiment of an exemplary gyroscope architecture, according to further non-limiting aspects described herein.

FIG. 8 depicts an exemplary drive mode shape of a non-limiting embodiment of an exemplary gyroscope architecture 100, according to further non-limiting aspects described herein. As depicted in FIG. 2, drive motion applied via the four exemplary drive shuttles 310 as described above result in deflection and translation of the various components of exemplary gyroscope architecture 100, as described herein. It can be seen in FIG. 8 from the relative lack of displacement of the in-plane motion components (GZ), which are separated from the out-of-plane motion components (GX) and constrained by the coupling mechanisms or lever arms 128, 130 that are configured to couple the respective pairs of the four proof masses (e.g., GZ proof masses 120, 122, 124, 126) motions, various embodiments as described herein can be configured to constrain transmission of the out-of-plane motion components (GX, GY) to the in plain motion components (GZ) (drive shuttle, Z proof masses), and, thus, the transmission of the levitation force associated with the out-of-plane motion components (GX, GY) can be minimized.

Figure 9:
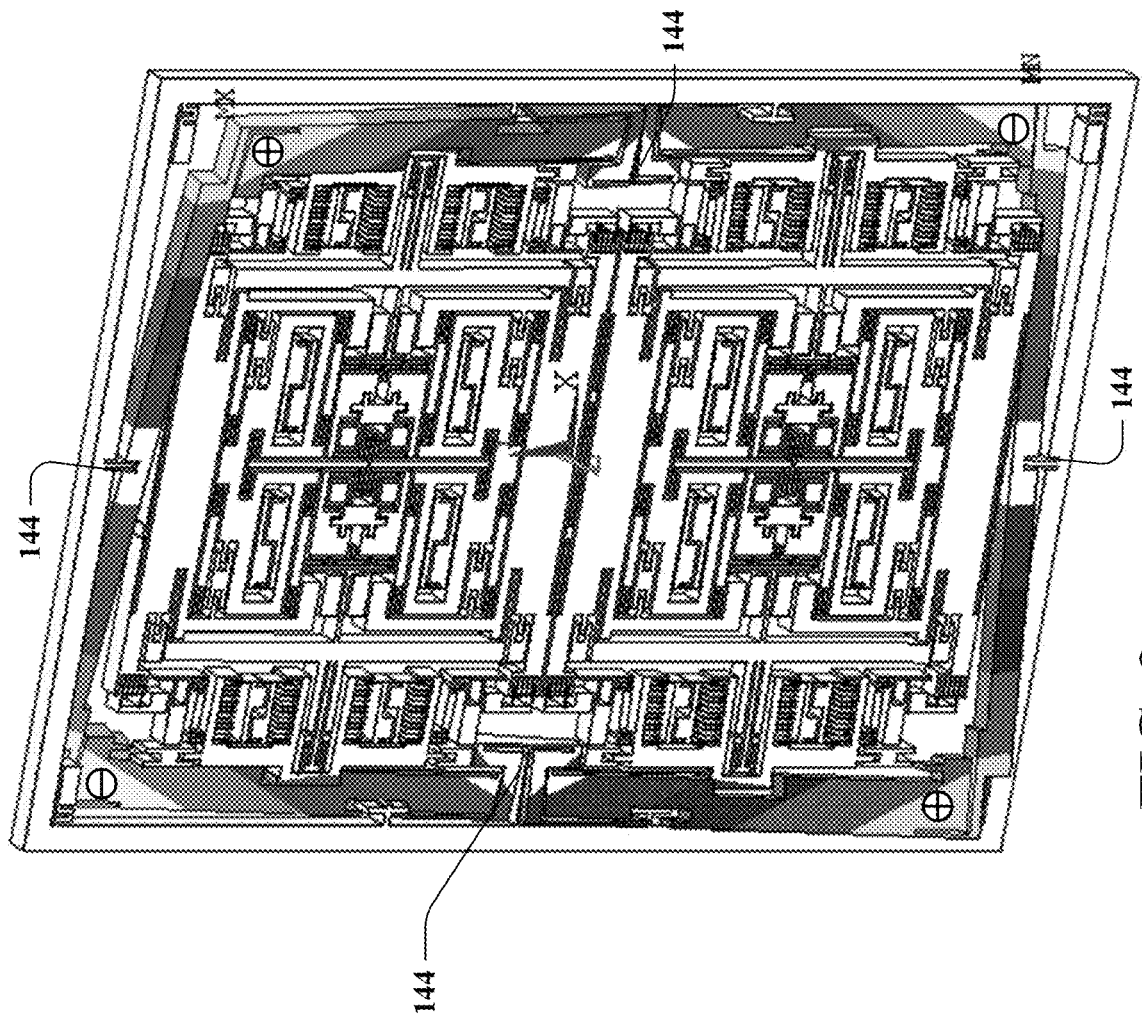
FIG. 9 depicts an exemplary GX mode shape of a non-limiting embodiment of an exemplary gyroscope architecture, according to still further non-limiting aspects described herein.

FIG. 9 depicts an exemplary GX mode shape of a non-limiting embodiment of an exemplary gyroscope architecture 100, according to still further non-limiting aspects described herein. FIG. 9 depicts the relative displacement above and below X-Y plane, where the "+" symbol indicates above plane X-Y plane displacement and the "−" symbol indicates below plane displacement, in lieu of color heat map or adequate grey scale resolution. It can be seen in FIG. 9, that the GX, outer frame, or saddle gyroscope sense mode is a balanced sense mode, where each of the GX proof masses are in anti-phase motion, as facilitated by exemplary fixed pivot point functionally generated by the structures indicated in FIG. 9.

FIG. 10 depicts an exemplary GY mode shape of a non-limiting embodiment of an exemplary gyroscope architecture, according to still further non-limiting aspects described herein. FIG. 10 depicts the relative displacement above and below X-Y plane, where the "+" symbol indicates above plane X-Y plane displacement and the "−" symbol indicates below plane displacement, in lieu of color heat map or adequate grey scale resolution. It can be seen in FIG. 10, that GY or frame gyroscope sense mode is a balanced sense mode, where each of the GY proof masses are in anti-phase motion (e.g., both linear and angular momentum balanced). It can be further seen in FIG. 10 from the relative lack of displacement of the in-plane motion components (GZ), which are separated from the out-of-plane motion components (GX) and constrained by the coupling mechanisms or lever arms 128, 130 that are configured to couple the respective pairs of the four proof masses (e.g., GZ proof masses 120, 122, 124, 126) motions, various embodiments as described herein can be configured to constrain transmission of the out-of-plane motion components (GX, GY) to the in plain motion components (GZ) (drive shuttle, Z proof masses), and, thus, the transmission of the levitation force associated with the out-of-plane motion components (GX, GY) can be minimized. In addition, it can be seen from FIG. 10 can facilitate isolation of levitation forces on the drive combs (e.g., drive combs 314) from being transferred to the frame proof masses.

FIG. 11 depicts an exemplary GZ sense mode shape of a non-limiting embodiment of an exemplary gyroscope architecture, according to non-limiting aspects described herein. FIG. 11 depicts the relative displacement in the X-Y plane, where the "+" symbol indicates +X displacement and the "−" symbol indicates −X displacement, in lieu of color heat map or adequate grey scale resolution. It can be seen in FIG. 11, that the GZ gyroscope sense mode is a balanced sense mode, where each of the GZ proof masses are in anti-phase motion.

FIG. 12 depicts an exemplary GZ parasitic mode shape of a non-limiting embodiment of an exemplary gyroscope architecture, according to still further non-limiting aspects described herein. FIG. 12 depicts the relative displacement in the X-Y plane, where the "+" symbol indicates +displacement and the "−" symbol indicates —displacement, in lieu of color heat map or adequate grey scale resolution. It can be seen in FIG. 12, that the GZ gyroscope has a linear and angular momentum balanced parasitic mode.

Accordingly, exemplary non-limiting embodiments can comprise a 3-axis Coriolis vibratory rate gyroscope, in a roughly 2 dimensional device architecture, with the geometry largely being flat, and capable of being fabricated in silicon. In non-limiting aspects, exemplary embodiments as described herein can comprise two inner frame (e.g., GY) gyroscopes, wherein the inner frame gyroscopes facilitate GY sense mode and drive system coupling, two outer frame, or saddle gyroscope, four drive shuttles coupled to the two outer frame gyroscopes, four GZ proof masses coupled to the GY or inner frame gyroscopes, and/or two lever arms or coupling mechanisms that facilitate coupling GZ proof masses. In still further non-limiting aspects, various exemplary embodiments can be configured such that components can be removed from an exemplary overall architecture to fabricate a single axis or two axis gyroscope and/or can be configured such that a number of proof-masses can be reduced in half from an exemplary overall architecture to fabricate a half-gyroscope, as further described herein.

Figure 13:
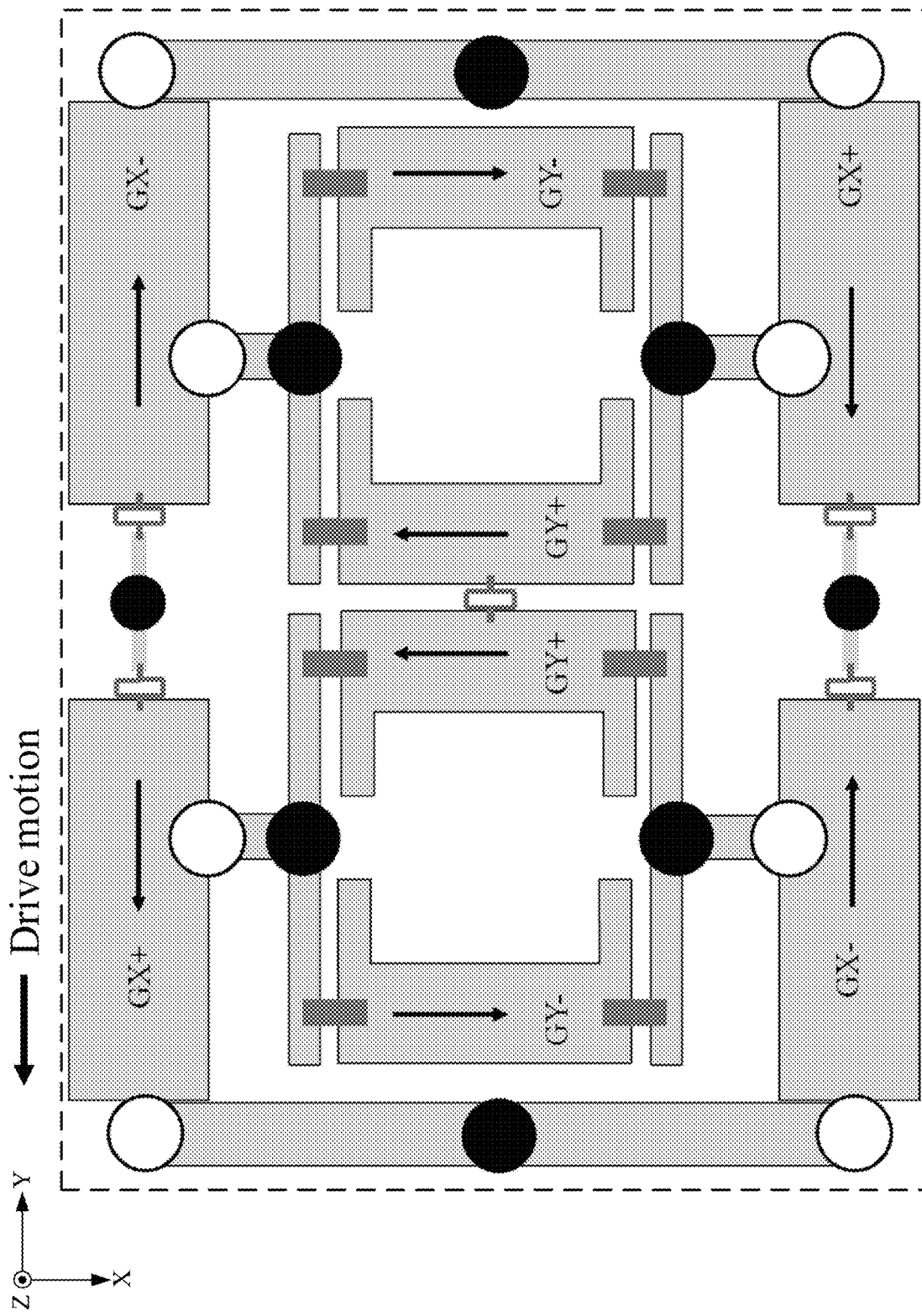
FIG. 13 illustrates a functional block diagram of other non-limiting embodiments of an exemplary gyroscope architecture, according to further non-limiting aspects of the subject disclosure.

For example, FIG. 13 illustrates a functional block diagram of other non-limiting embodiments of an exemplary gyroscope architecture 100, according to further non-limiting aspects of the subject disclosure. For instance, according to a non-limiting aspect, an exemplary 3-axis (e.g., GX, GY, and GZ) gyroscope architecture 100 can be reduced to a 2-axis or 1-axis gyroscope by removing components from the architecture, employing fewer sense transducers, etc., and exemplary gyroscope architectures as described herein can be functionally cut in half to create a more compact 3-axis (e.g., GX, GY, and GZ) gyroscope, by forgoing drive and/or sense balanced aspects of the exemplary 3-axis (e.g., GX, GY, and GZ) gyroscope architectures. For instance, as depicted in FIG. 13, the four GZ proof masses can be omitted to fabricate a balanced two axis (e.g., X-Y gyroscope). In a further non-limiting aspect, two GX proof masses, or outer frame gyroscopes and respective GY or inner frame gyroscope can be omitted from the fabrication as in FIG. 15 to yield a 2-axis gyroscope in half the footprint of the balanced 2-axis gyroscope. In other non-limiting aspects, GY electrodes 162, 164, 166, 168 can be omitted from the fabrication or electrical connection, such that variants of exemplary gyroscope architecture 100 could yield a 1-axis gyroscope.

Figure 14:
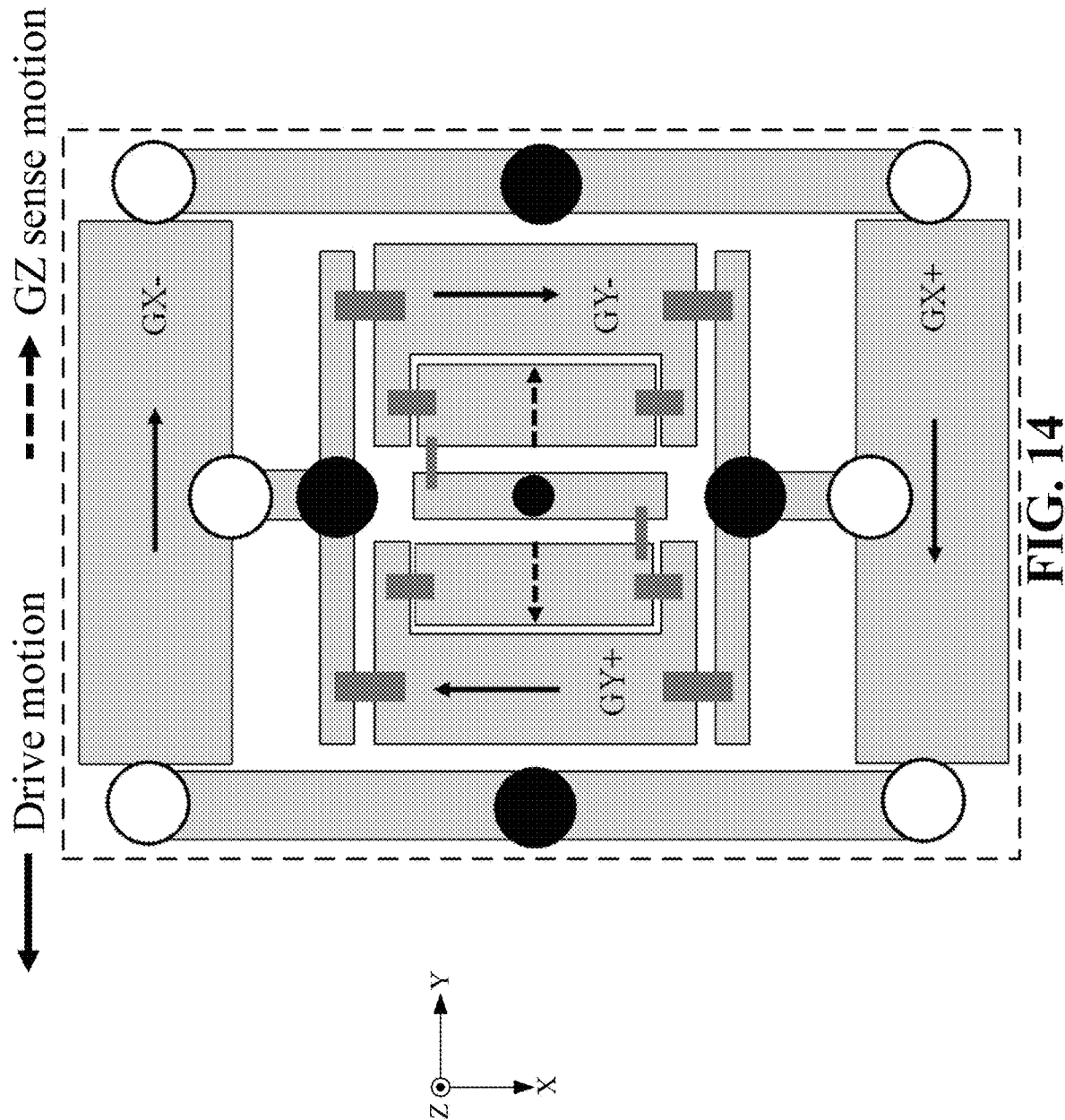
FIG. 14 illustrates another functional block diagram of still other non-limiting embodiments of an exemplary gyroscope architecture, according to further non-limiting aspects of the subject disclosure.

In another non-limiting example, FIG. 14 illustrates another functional block diagram of still other non-limiting embodiments of an exemplary gyroscope architecture 100, according to further non-limiting aspects of the subject disclosure. For instance, exemplary gyroscope architecture 100 could yield a more compact but non-balanced drive and sense 3-axis gyroscope by omitting one half of the components of exemplary gyroscope architecture 100. Other variants can include omission of the GZ proof masses to yield a 2-axis, X-Y gyroscope with drive system coupled to the GY or frame gyros as described herein.

Accordingly, in other non-limiting implementations, an exemplary MEMS device (e.g., comprising exemplary gyroscope architecture 100, or portions thereof) comprising one or more inner frame gyroscope (e.g., GY or inner frame gyroscope comprising two or more GY proof masses 104, 106, 108, 110, etc.) configured to sense a first component of angular velocity associated with the MEMS device (e.g., comprising exemplary gyroscope architecture 100, or portions thereof) around a first axis (e.g., Y axis), for example, as described herein. As used herein, a frame gyroscope can be understood to comprise a guided mass system comprising two proof masses and a rotating arm connecting the two proof masses and constraining the proof masses to anti-phase motion. As further used herein an outer frame gyroscope can be understood to surround and/or be flexibly coupled to the inner frame gyroscope.

As further described herein, an exemplary MEMS device (e.g., comprising exemplary gyroscope architecture 100, or portions thereof) can further comprise an outer frame gyroscope (e.g., GX or outer frame gyroscope comprising two or more GX proof masses 132, 134, 136, 138, etc.) flexibly coupled (e.g., via coupling 148/150/152/154, or portions thereof) to the one or more inner frame gyroscope (e.g., GY or inner frame gyroscope comprising two or more GY proof masses 104, 106, 108, 110, etc.) and configured to sense a second component of angular velocity associated with the MEMS device (e.g., comprising exemplary gyroscope architecture 100, or portions thereof) around a second axis (e.g., X axis) that can be orthogonal to the first axis (e.g., Y axis).

In addition, an exemplary MEMS device (e.g., comprising exemplary gyroscope architecture 100, or portions thereof) can further comprise two or more proof masses (e.g., of GZ proof masses 120, 122, 124, 126) coupled to the one or more inner frame gyroscope (e.g., GY or inner frame gyroscope comprising two or more GY proof masses 104, 106, 108, 110, etc.) and configured to sense a third component of angular velocity associated with the MEMS device (e.g., comprising exemplary gyroscope architecture 100, or portions thereof) around a third axis (e.g., Z axis) that can be orthogonal to the first axis (e.g., Y axis) and the second axis (e.g., X axis).

In a non-limiting aspect, a motion associated with the two or more proof masses (e.g., of GZ proof masses 120, 122, 124, 126) can be coupled, at least in part, to in plane motion (e.g., X-Y plane) of the one or more inner frame gyroscope (e.g., GY or inner frame gyroscope comprising two or more GY proof masses 104, 106, 108, 110, etc.) via respective coupling mechanisms (e.g., via coupling mechanisms or lever arms 128, 130), and wherein the in plane motion can be defined with reference to a plane comprising the first axis (e.g., Y axis) and the second axis (e.g., X axis). For instance, in another non-limiting aspect, the two or more proof masses (e.g., of GZ proof masses 120, 122, 124, 126) can be configured to facilitate constraining, at least in part, the motion associated with the two or more proof masses (e.g., of GZ proof masses 120, 122, 124, 126) into a condition of linear and angular momentum balance.

As further described herein, an exemplary MEMS device (e.g., comprising exemplary gyroscope architecture 100, or portions thereof) can further comprise one or more coupling mechanism (e.g., coupling mechanisms or lever arms 128, 130) between the two or more proof masses (e.g., of GZ proof masses 120, 122, 124, 126) configured to force the two or more proof masses (e.g., of GZ proof masses 120, 122, 124, 126) into anti-phase motion as a result of the third component of angular velocity applied to the MEMS device (e.g., comprising exemplary gyroscope architecture 100, or portions thereof) around the third axis (e.g., Z axis).

In addition, an exemplary MEMS device (e.g., comprising exemplary gyroscope architecture 100, or portions thereof) can further comprise two or more drive shuttles (e.g., drive shuttles 310) coupled (e.g., via lever arms 112, 114, 116, 118, or portions thereof) to one or more of the one or more inner frame gyroscope (e.g., GY or inner frame gyroscope comprising two or more GY proof masses 104, 106, 108, 110, etc.) or the outer frame gyroscope (e.g., GX or outer frame gyroscope comprising two or more GX proof masses 132, 134, 136, 138, etc.) and configured to force the one or more of the one or more inner frame gyroscope (e.g., GY or inner frame gyroscope comprising two or more GY proof masses 104, 106, 108, 110, etc.) or the outer frame gyroscope (e.g., GX or outer frame gyroscope comprising two or more GX proof masses 132, 134, 136, 138, etc.) into oscillation. In a non-limiting aspect, the outer frame gyroscope (e.g., GX or outer frame gyroscope comprising two or more GX proof masses 132, 134, 136, 138, etc.) can be coupled to the one or more inner frame gyroscope (e.g., GY or inner frame gyroscope comprising two or more GY proof masses 104, 106, 108, 110, etc.) at least in part via the two or more drive shuttles (e.g., drive shuttles 310).

In another non-limiting aspect, one or more of the outer frame gyroscope (e.g., GX or outer frame gyroscope comprising two or more GX proof masses 132, 134, 136, 138, etc.), the one or more inner frame gyroscope (e.g., GY or inner frame gyroscope comprising two or more GY proof masses 104, 106, 108, 110, etc.), or one or more of the two or more drive shuttles can be configured to sense drive motion (e.g., via drive sense combs 312) associated with the oscillation. In still another non-limiting aspect, the two or more drive shuttles (e.g., drive shuttles 310) can be configured to move in anti-phase drive motion and can be configured to minimize transmission of out of plane motion of the two or more drive shuttles (e.g., drive shuttles 310) to the one or more inner frame gyroscope (e.g., GY or inner frame gyroscope comprising two or more GY proof masses 104, 106, 108, 110, etc.).

As further described herein, an exemplary MEMS device (e.g., comprising exemplary gyroscope architecture 100, or portions thereof) can further comprise one or more of the outer frame gyroscope (e.g., GX or outer frame gyroscope comprising two or more GX proof masses 132, 134, 136, 138, etc.) or the one or more inner frame gyroscope (e.g., GY or inner frame gyroscope comprising two or more GY proof masses 104, 106, 108, 110, etc.) can be configured to be driven by a set of drive electrodes (e.g., drive combs 314), for example, as described herein.

In addition, in still other non-limiting implementations, an exemplary MEMS device (e.g., comprising exemplary gyroscope architecture 100, or portions thereof) comprising one or more inner frame gyroscope (e.g., GY or inner frame gyroscope comprising two or more GY proof masses 104, 106, 108, 110, etc.) configured to sense a first component of angular velocity associated with the MEMS device (e.g., comprising exemplary gyroscope architecture 100, or portions thereof) around a first axis (e.g., Y axis), for example, as described herein.

As further described herein, an exemplary MEMS device (e.g., comprising exemplary gyroscope architecture 100, or portions thereof) can further comprise two or more proof masses (e.g., of GZ proof masses 120, 122, 124, 126) coupled to the one or more inner frame gyroscope (e.g., GY or inner frame gyroscope comprising two or more GY proof masses 104, 106, 108, 110, etc.) and configured to sense a second component of angular velocity associated with the MEMS device (e.g., comprising exemplary gyroscope architecture 100, or portions thereof) around a second axis (e.g., Z axis) that can be orthogonal to the first axis (e.g., Y axis).

In addition, in still other non-limiting implementations, an exemplary MEMS device (e.g., comprising exemplary gyroscope architecture 100, or portions thereof) comprising one or more coupling mechanism between the two or more proof masses (e.g., of GZ proof masses 120, 122, 124, 126) configured to force the two or more proof masses (e.g., of GZ proof masses 120, 122, 124, 126) into anti-phase motion as a result of the second component of angular velocity applied to the MEMS device (e.g., comprising exemplary gyroscope architecture 100, or portions thereof) around the second axis (e.g., Z axis), for example, as described herein. In a non-limiting aspect, a motion associated with the two or more proof masses (e.g., of GZ proof masses 120, 122, 124, 126) can be coupled, at least in part, to in plane motion of the one or more inner frame gyroscope (e.g., GY or inner frame gyroscope comprising two or more GY proof masses 104, 106, 108, 110, etc.) via respective coupling mechanisms, and wherein the in plane motion can be defined with reference to a plane normal to the second axis (e.g., X-Y plane). In another non-limiting aspect, the two or more proof masses (e.g., of GZ proof masses 120, 122, 124, 126) can be configured to facilitate constraining, at least in part, the motion associated with the two or more proof masses (e.g., of GZ proof masses 120, 122, 124, 126) into a condition of linear and angular momentum balance.

As further described herein, an exemplary MEMS device (e.g., comprising exemplary gyroscope architecture 100, or portions thereof) can further comprise two or more drive shuttles (e.g., drive shuttles 310) coupled to the one or more inner frame gyroscope (e.g., GY or inner frame gyroscope comprising two or more GY proof masses 104, 106, 108, 110, etc.) and configured to force the one or more inner frame gyroscope (e.g., GY or inner frame gyroscope comprising two or more GY proof masses 104, 106, 108, 110, etc.) into oscillation. In a non-limiting aspect, the two or more drive shuttles (e.g., drive shuttles 310) can be configured to move in anti-phase drive motion and can be configured to minimize transmission of out of plane motion of the two or more drive shuttles (e.g., drive shuttles 310) to the one or more inner frame gyroscope (e.g., GY or inner frame gyroscope comprising two or more GY proof masses 104, 106, 108, 110, etc.).

In other non-limiting implementations, in still other non-limiting implementations, an exemplary MEMS device (e.g., comprising exemplary gyroscope architecture 100, or portions thereof) comprising two inner frame gyroscopes (e.g., GY or inner frame gyroscope comprising GY proof masses 104, 106, 108, 110, etc.) configured to sense a first component of angular velocity associated with the MEMS device (e.g., comprising exemplary gyroscope architecture 100, or portions thereof) around a first axis (e.g., Y axis), for example, as described herein. As a non-limiting example, an exemplary MEMS device (e.g., comprising exemplary gyroscope architecture 100, or portions thereof) can be configured to operate as one or more of a two axis gyroscope or a three axis gyroscope. In a non-limiting aspect, one of the two inner frame gyroscopes (e.g., GY or inner frame gyroscope comprising GY proof masses 104, 106, 108, 110, etc.) can be flexibly coupled (e.g., via a spring or flexure 145) to the other of the two inner frame gyroscopes (e.g., GY or inner frame gyroscope comprising GY proof masses 104, 106, 108, 110, etc.) and configured to constrain the out of plane and the in plane motion of the two inner frame gyroscopes (e.g., GY or inner frame gyroscope comprising GY proof masses 104, 106, 108, 110, etc.) to be in phase.

As further described herein, an exemplary MEMS device (e.g., comprising exemplary gyroscope architecture 100, or portions thereof) can further comprise two outer frame gyroscopes (e.g., GX or outer frame gyroscope comprising GX proof masses 132, 134, 136, 138, etc.) configured to sense a second component of angular velocity associated with the MEMS device (e.g., comprising exemplary gyroscope architecture 100, or portions thereof) around a second axis (e.g., X axis) that can be orthogonal to the first axis (e.g., Y axis). In a non-limiting aspect, the two outer frame gyroscopes (e.g., GX or outer frame gyroscope comprising GX proof masses 132, 134, 136, 138, etc.) can be coupled (e.g., via coupling 148/150/152/154, or portions thereof) to the two inner frame gyroscope (e.g., GY or inner frame gyroscope comprising two or more GY proof masses 104, 106, 108, 110, etc.) at least in part via the four drive shuttles (e.g., drive shuttles 310). In another non-limiting aspect, one or more of the outer frame gyroscope (e.g., GX or outer frame gyroscope comprising two or more GX proof masses 132, 134, 136, 138, etc.) or the one or more of the two inner frame gyroscopes (e.g., GY or inner frame gyroscope comprising GY proof masses 104, 106, 108, 110, etc.) can be configured to be driven by a set of drive electrodes (e.g., drive combs 314, as further described herein.

As a further non-limiting example, the two outer frame gyroscopes (e.g., GX or outer frame gyroscope comprising GX proof masses 132, 134, 136, 138, etc.) can be flexibly coupled (e.g., via coupling 148/150/152/154, or portions thereof) to the two inner frame gyroscopes (e.g., GY or inner frame gyroscope comprising GY proof masses 104, 106, 108, 110, etc.) and configured to constrain out of plane and in plane motion of the two outer frame gyroscopes (e.g., GX or outer frame gyroscope comprising GX proof masses 132, 134, 136, 138, etc.) and the two inner frame gyroscopes (e.g., GY or inner frame gyroscope comprising GY proof masses 104, 106, 108, 110, etc.) to be in phase.

In addition, an exemplary MEMS device (e.g., comprising exemplary gyroscope architecture 100, or portions thereof) can further comprise four proof masses (e.g., of GZ proof masses 120, 122, 124, 126) coupled to the two inner frame gyroscopes (e.g., GY or inner frame gyroscope comprising GY proof masses 104, 106, 108, 110, etc.) and configured to sense a third component of angular velocity associated with the MEMS device (e.g., comprising exemplary gyroscope architecture 100, or portions thereof) around a third axis (e.g., Z axis) that can be orthogonal to the first axis (e.g., Y axis) and the second axis (e.g., X axis).

Moreover, in still other non-limiting implementations, an exemplary MEMS device (e.g., comprising exemplary gyroscope architecture 100, or portions thereof) comprising two coupling mechanisms (e.g., coupling mechanisms or lever arms 128, 130) associated with pairs of the four proof masses (e.g., of GZ proof masses 120, 122, 124, 126) configured to force the pairs of the four proof masses (e.g., of GZ proof masses 120, 122, 124, 126) into anti-phase motion as a result of the third component of angular velocity applied to the MEMS device (e.g., comprising exemplary gyroscope architecture 100, or portions thereof) around the third axis (e.g., Z axis) and configured to result no net angular momentum in the four proof masses (e.g., of GZ proof masses 120, 122, 124, 126) as a result of the two inner frame gyroscopes (e.g., GY or inner frame gyroscope comprising GY proof masses 104, 106, 108, 110, etc.), for example, as described herein.

As further described herein, an exemplary MEMS device (e.g., comprising exemplary gyroscope architecture 100, or portions thereof) can further comprise four drive shuttles (e.g., drive shuttles 310) coupled to one or more of the two inner frame gyroscopes (e.g., GY or inner frame gyroscope comprising GY proof masses 104, 106, 108, 110, etc.) or the outer frame gyroscope (e.g., GX or outer frame gyroscope comprising two or more GX proof masses 132, 134, 136, 138, etc.) and configured to force the one or more of the two inner frame gyroscopes (e.g., GY or inner frame gyroscope comprising GY proof masses 104, 106, 108, 110, etc.) or the outer frame gyroscope (e.g., GX or outer frame gyroscope comprising two or more GX proof masses 132, 134, 136, 138, etc.) into oscillation. In a non-limiting aspect, one or more of the outer frame gyroscope (e.g., GX or outer frame gyroscope comprising two or more GX proof masses 132, 134, 136, 138, etc.), the two inner frame gyroscopes (e.g., GY or inner frame gyroscope comprising GY proof masses 104, 106, 108, 110, etc.), or one or more of the four drive shuttles (e.g., drive shuttles 310) can be configured to sense drive motion (e.g., via drive sense combs 312) associated with the oscillation. In another non-limiting aspect, pairs of the four drive shuttles (e.g., drive shuttles 310) can be configured to move in anti-phase drive motion and can be configured to minimize transmission of out of plane motion of the pairs of the four drive shuttles (e.g., drive shuttles 310) to the two inner frame gyroscopes (e.g., GY or inner frame gyroscope comprising GY proof masses 104, 106, 108, 110, etc.), as further described herein.

In addition, in still other non-limiting implementations, an exemplary MEMS device (e.g., comprising exemplary gyroscope architecture 100, or portions thereof) comprising coupling mechanisms (e.g., via fixed pivot points 144 and respective outer frame lever arms 140/142 or portions thereof) associated with two outer frame gyroscopes (e.g., GX or outer frame gyroscope comprising GX proof masses 132, 134, 136, 138, etc.) configured to force the two outer frame gyroscopes (e.g., GX or outer frame gyroscope comprising GX proof masses 132, 134, 136, 138, etc.) into anti-phase motion as a result of the second component of angular velocity applied to the MEMS device (e.g., comprising exemplary gyroscope architecture 100, or portions thereof) around the second axis (e.g., X axis), for example, as described herein.

Other non-limiting implementations of exemplary MEMS device (e.g., comprising exemplary gyroscope architecture 100, or portions thereof) can comprise a stress isolation frame (e.g., stress isolation frame 308) coupled to the MEMS device (e.g., comprising exemplary gyroscope architecture 100, or portions thereof) and configured to reject stress transmitted from a package associated with the MEMS device (e.g., comprising exemplary gyroscope architecture 100, or portions thereof) to the MEMS device (e.g., comprising exemplary gyroscope architecture 100, or portions thereof), for example, as further described herein.

In view of the subject matter described supra, various methods can be implemented in accordance with the subject disclosure directed to methods of operation of the various embodiments described herein, in terms of motions of the various components, actuation of the drive systems, experiencing applied angular momentum, sensing the same, and so, as well as methods of fabrication direction to various fabrication steps to form the component parts of the various embodiments herein. For purposes of simplicity of explanation, such methods can be described as a series of steps, and it is to be understood and appreciated that such illustrations or corresponding descriptions as would be apprehended by one skilled in the art based on review of the embodiments herein, would not be limited by the order of the steps, as some steps may occur in different orders and/or concurrently with other steps from what is depicted and/or described herein.

What has been described above includes examples of the embodiments of the subject disclosure. While specific embodiments and examples are described in the subject disclosure for illustrative purposes, various modifications are possible that are considered within the scope of such embodiments and examples, as those skilled in the relevant art can recognize. It is, of course, not possible to describe every conceivable combination of configurations, components, and/or methods for purposes of describing the claimed subject matter, but it is to be appreciated that many further combinations and permutations of the various embodiments are possible. Thus, although the disclosed subject matter has been described in accordance with the embodiments shown, one of ordinary skill in the art will readily recognize that there could be variations to the embodiments and those variations would be within the spirit and scope of the disclosed subject matter. Accordingly, many modifications may be made by one of ordinary skill in the art without departing from the spirit and scope of the disclosed subject matter. As a result, the claimed subject matter is intended to embrace all such alterations, modifications, and variations that fall within the spirit and scope of the appended claims.

In addition, the words "example" or "exemplary" is used herein to mean serving as an example, instance, or illustration. Any aspect or design described herein as "exemplary" is not necessarily to be construed as preferred or advantageous over other aspects or designs. Rather, use of the word, "exemplary," is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while an aspect may have been disclosed with respect to only one of several embodiments, such feature may be combined with one or more other features of the other embodiments as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A microelectromechanical systems (MEMS) device, comprising:
   at least one inner frame gyroscope configured to sense a first component of angular velocity associated with the MEMS device around a first axis;
   an outer frame gyroscope flexibly coupled to the at least one inner frame gyroscope and configured to sense a second component of angular velocity associated with the MEMS device around a second axis that is orthogonal to the first axis;
   two outer frame lever arms associated with the outer frame gyroscope and configured to force the outer frame gyroscope into oscillation; and
   at least two drive shuttles coupled to the outer frame gyroscope and configured to force at least one of the at least one inner frame gyroscope or the outer frame gyroscope into oscillation.

2. The MEMS device of claim 1, further comprising:
   at least two proof masses coupled to the at least one inner frame gyroscope and configured to sense a third component of angular velocity associated with the MEMS device around a third axis that is orthogonal to the first axis and the second axis.

3. The MEMS device of claim 2, wherein a motion associated with the at least two proof masses is coupled, at least in part, to in plane motion of the at least one inner frame gyroscope via respective coupling mechanisms, and wherein the in plane motion is defined with reference to a plane comprising the first axis and the second axis.

4. The MEMS device of claim 3, wherein the at least two proof masses are configured to facilitate constraining, at least in part, the motion associated with the at least two proof masses into a condition of linear and angular momentum balance.

5. The MEMS device of claim 2, further comprising:
   at least one coupling mechanism between the at least two proof masses configured to force the at least two proof masses into anti-phase motion as a result of the third component of angular velocity applied to the MEMS device around the third axis.

6. The MEMS device of claim 1, wherein the outer frame gyroscope is coupled to the at least one inner frame gyroscope.

7. The MEMS device of claim 1, wherein at least one of the outer frame gyroscope, the at least one inner frame gyroscope, or at least one of the at least two drive shuttles is configured to sense drive motion associated with the oscillation.

8. The MEMS device of claim 1, wherein the at least two drive shuttles are configured to move in anti-phase drive motion and are configured to minimize transmission of out of plane motion of the at least two drive shuttles to at least one of the outer frame gyroscope or the at least one inner frame gyroscope.

9. The MEMS device of claim 1, wherein at least one of the outer frame gyroscope or the at least one inner frame gyroscope is configured to be driven by a set of drive electrodes.

10. A microelectromechanical systems (MEMS) device, comprising:
   two inner frame gyroscopes configured to sense a first component of angular velocity associated with the MEMS device around a first axis;
   two outer frame gyroscopes configured to sense a second component of angular velocity associated with the MEMS device around a second axis that is orthogonal to the first axis;
   four proof masses coupled to the two inner frame gyroscopes and configured to sense a third component of angular velocity associated with the MEMS device around a third axis that is orthogonal to the first axis and the second axis;
   two outer frame lever arms associated with the two outer frame gyroscopes and configured to force the two outer frame gyroscopes into oscillation; and
   four drive shuttles coupled to at least one of the two inner frame gyroscopes or the two outer frame gyroscopes and configured to force the at least one of the two inner frame gyroscopes or the two outer frame gyroscopes into oscillation.

11. The MEMS device of claim 10, further comprising:
   two coupling mechanisms associated with pairs of the four proof masses configured to force the pairs of the four proof masses into anti-phase motion as a result of the third component of angular velocity applied to the MEMS device around the third axis and configured to result in no net angular momentum in the four proof masses as a result of the two inner frame gyroscopes.

12. The MEMS device of claim 10, wherein the MEMS device is configured to operate as at least one of a one axis gyroscope, a two axis gyroscope, or a three axis gyroscope.

13. The MEMS device of claim 10, wherein at least one of the two outer frame gyroscopes, at least one of the two inner frame gyroscopes, or at least one of the four drive shuttles is configured to sense drive motion associated with the oscillation.

14. The MEMS device of claim 13, wherein the at least one of the two outer frame gyroscopes or the at least one of the two inner frame gyroscopes is configured to be driven by a set of drive electrodes.

15. The MEMS device of claim 10, wherein pairs of the four drive shuttles are configured to move in anti-phase drive motion and are configured to minimize transmission of out of plane motion of the pairs of the four drive shuttles to the two inner frame gyroscopes.

16. The MEMS device of claim 10, wherein the two outer frame gyroscopes are flexibly coupled to the two inner frame gyroscopes and configured to constrain out of plane and in plane motion of the two outer frame gyroscopes and the two inner frame gyroscopes to be in phase.

17. The MEMS device of claim 16, wherein one of the two inner frame gyroscopes is flexibly coupled to the other of the two inner frame gyroscopes and configured to constrain the out of plane and the in plane motion of the two inner frame gyroscopes to be in phase.

18. The MEMS device of claim 10, further comprising:
   coupling mechanisms associated with two outer frame gyroscopes configured to force the two outer frame gyroscopes into anti-phase motion as a result of the second component of angular velocity applied to the MEMS device around the second axis.

19. The MEMS device of claim 10, further comprising:
   a stress isolation frame coupling the MEMS device to at least one of a substrate or package comprising the MEMS device.

20. The MEMS device of claim 10, wherein the two inner frame gyroscopes, the two outer frame gyroscopes, and the four proof masses lie substantially in a plane that has an axis of symmetry parallel to the first axis.

* * * * *